US010277808B2

(12) United States Patent
Takahashi

(10) Patent No.: US 10,277,808 B2
(45) Date of Patent: Apr. 30, 2019

(54) IMAGING APPARATUS AND METHOD FOR CONTROLLING THE SAME

(71) Applicant: CANON KABUSHIKI KAISHA, Tokyo (JP)

(72) Inventor: Tomoaki Takahashi, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/847,300

(22) Filed: Dec. 19, 2017

(65) Prior Publication Data
US 2018/0183996 A1 Jun. 28, 2018

(30) Foreign Application Priority Data

Dec. 27, 2016 (JP) ................. 2016-254226

(51) Int. Cl.
H04N 5/232 (2006.01)
H04N 5/262 (2006.01)
G06F 3/0482 (2013.01)
G06F 3/0488 (2013.01)
G06F 3/0481 (2013.01)

(52) U.S. Cl.
CPC ..... *H04N 5/23222* (2013.01); *H04N 5/23212* (2013.01); *H04N 5/23245* (2013.01); *H04N 5/23293* (2013.01); *H04N 5/23296* (2013.01); *H04N 5/2628* (2013.01); *G06F 3/0482* (2013.01); *G06F 3/0488* (2013.01); *G06F 3/04817* (2013.01); *H04N 5/23216* (2013.01)

(58) Field of Classification Search
CPC .................................. H04N 5/23222

USPC ....................................................... 348/333.05
See application file for complete search history.

(56) References Cited

U.S. PATENT DOCUMENTS

2007/0242143 A1* 10/2007 Sugimoto .......... H04N 5/23293
348/240.2

FOREIGN PATENT DOCUMENTS

JP 2012-060567 A 3/2012
JP 2016-163104 A 9/2016
JP 2016163104 * 9/2016

* cited by examiner

Primary Examiner — Joel W Fosselman
(74) Attorney, Agent, or Firm — Canon U.S.A., Inc. I.P. Division

(57) ABSTRACT

An imaging apparatus including a control unit configured to perform control to present a first 2-area enlargement display of displaying live view images captured by two imaging regions that are separated in a width direction while arranging them on a display unit if an orientation of the imaging apparatus is a first orientation, and present a second 2-area enlargement display of displaying live view images captured by two imaging regions that are separated in a height direction while arranging them on the display unit if the orientation of the imaging apparatus is a second orientation. The control unit is configured to perform control to end the first 2-area enlargement display based on the orientation of the imaging apparatus changed from the first orientation in a manner satisfying a predetermined condition when the first 2-area enlargement display is presented.

15 Claims, 10 Drawing Sheets

FIG.8A1
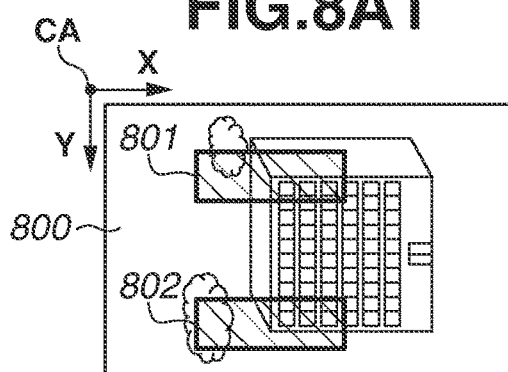
FIG.8A3
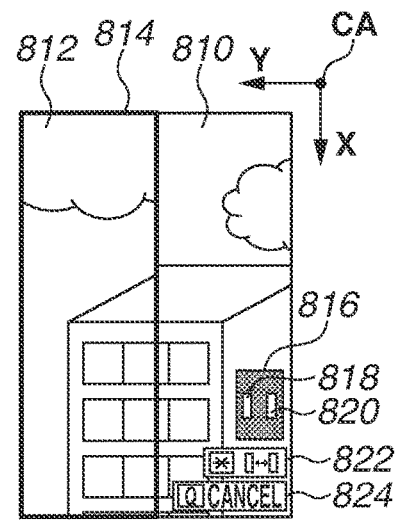
FIG.8A2
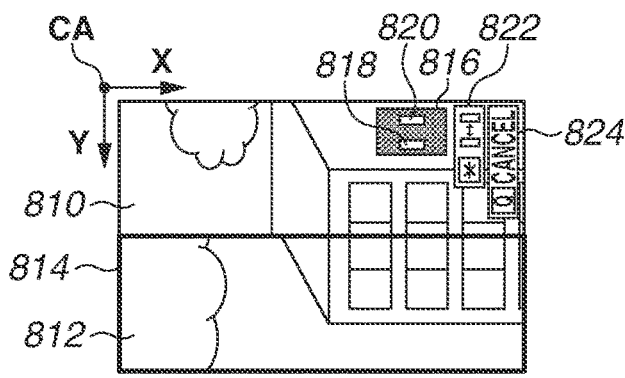
FIG.8B
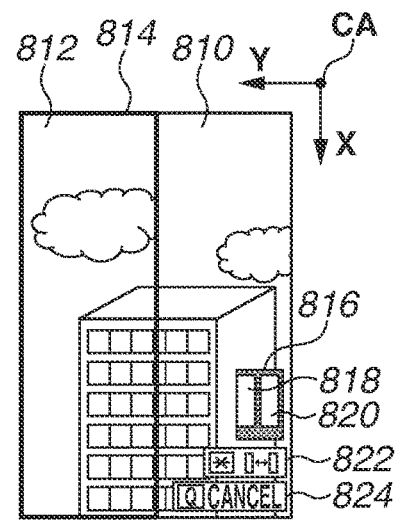

US 10,277,808 B2

IMAGING APPARATUS AND METHOD FOR CONTROLLING THE SAME

BACKGROUND OF THE INVENTION

Field of the Invention

The present disclosure relates to, for example, a technique for displaying a live view image while enlarging a part thereof.

Description of the Related Art

When a camera is used, it may be desirable to capture an image while holding the camera horizontally in some cases. When, for example, a building or a scenery is imaged, failing to keep the camera horizontal results in a tilt of the captured image, thereby causing an awkward result. To solve this issue, Japanese Patent Application Laid-Open No. 2012-060567 discusses a method for detecting an orientation of the camera based on a direction of gravitational force that is detected by an acceleration sensor, and displaying a level display indicating the detected orientation of the camera together with a live-view image. Further, Japanese Patent Application Laid-Open No. 2016-163104 discusses a method for displaying images generated by enlarging two regions separated in a left/right direction on a live view image, respectively, side by side, thereby allowing a user to achieve accurate horizontal alignment by visual confirmation.

When the user wants to capture an image in which a line of a subject appears to extend horizontally while holding the camera in a landscape orientation (normal orientation), the camera can assist in achieving the horizontal alignment by the visual confirmation, by displaying each of live view images captured at two regions in an image sensor that are separated in the left/right direction in an enlarged manner side by side, like the method discussed in Japanese Patent Application Laid-Open No. 2016-163104. On the other hand, when the user wants to capture an image in which the line of the subject appears to extend horizontally in a portrait image while holding the camera in a portrait orientation, the horizontal alignment is difficult to achieve even when the live view images captured at the two regions in the image sensor that are separated in the left/right direction are each displayed in the enlarged manner side by side.

SUMMARY OF THE INVENTION

The present disclosure is directed to an imaging apparatus allowing a user to easily adjust a tilt angle of the imaging apparatus both when the orientation of the imaging apparatus is the landscape orientation and when the orientation of the imaging apparatus is the portrait orientation, and a method for controlling the imaging apparatus.

According to an aspect of the present disclosure, an imaging apparatus includes an orientation detection unit configured to detect an orientation of the imaging apparatus, and a control unit configured to perform control so as to present a first 2-area enlargement display of displaying live view images captured by two imaging regions in an imaging unit that are separated in a width direction while arranging them on a display unit if the orientation detection unit detects that the orientation of the imaging apparatus is a first orientation, and present a second 2-area enlargement display of displaying live view images captured by two imaging regions in the imaging unit that are separated in a height direction while arranging them on the display unit if the orientation detection unit detects that the orientation of the imaging apparatus is a second orientation. The control unit is configured to perform control so as to end the first 2-area enlargement display based on the orientation of the imaging apparatus changed from the first orientation in a manner satisfying a predetermined condition when the first 2-area enlargement display is presented.

Further features of the present disclosure will become apparent from the following description of exemplary embodiments with reference to the attached drawings.

BRIEF DESCRIPTION OF THE DRAWINGS

FIGS. 7A1, 7A2, and 7B to 7G illustrate display examples when the 2-area enlargement processing in a left/right arrangement is performed.

FIGS. 8A1, 8A2, 8A3, and 8B to 8E illustrate display examples when the 2-area enlargement processing in an up/down arrangement is performed.

DESCRIPTION OF THE EMBODIMENTS

An exemplary embodiment of the present disclosure will be described in detail below with reference to the accompanying drawings.

It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

Figure 1A:
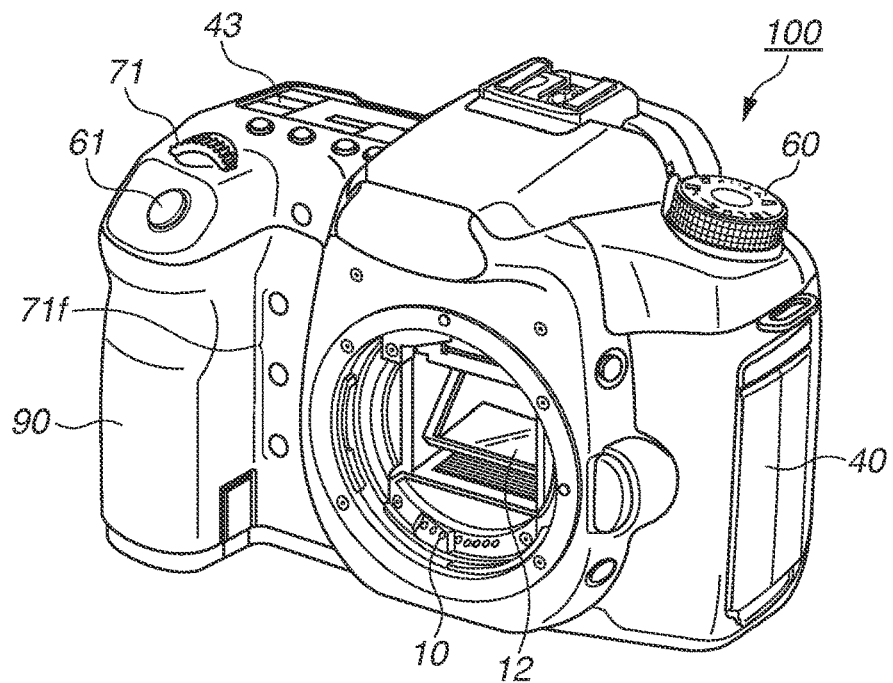
FIGS. 1A and 1B illustrate an external appearance of a digital camera.
Figure 1B:
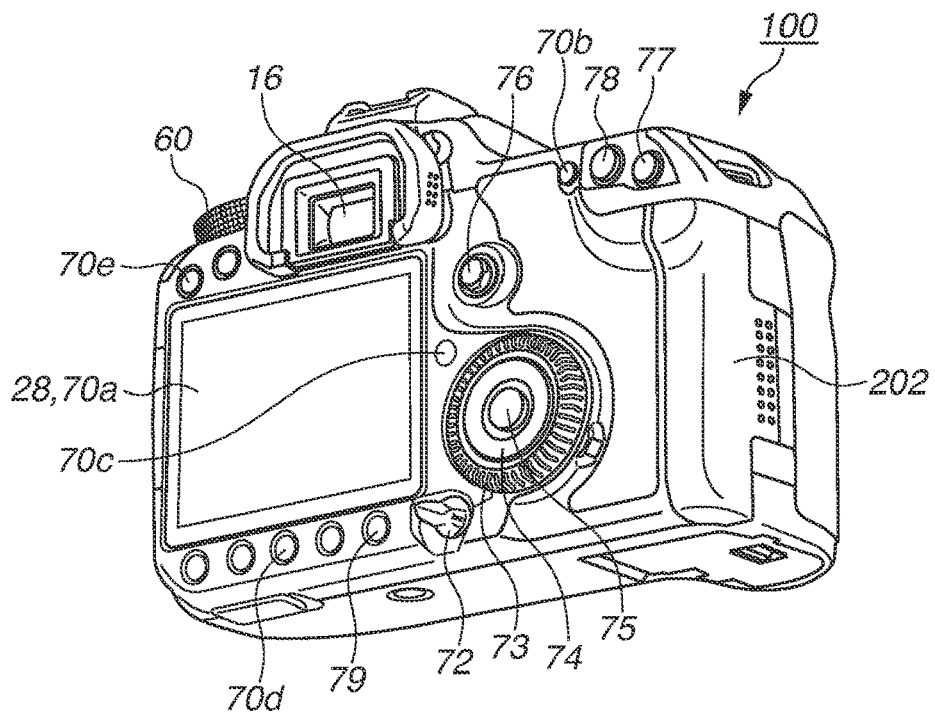

FIGS. 1A and 1B illustrate an external appearance of a digital camera 100 as one example of an apparatus to which the present disclosure can be applied. FIG. 1A is a perspective view of a front side of the digital camera 100, and FIG. 1B is a perspective view of a back side of the digital camera 100. In FIGS. 1A and 1B, a display unit 28 is a display unit provided on the back side of the digital camera 100 for displaying an image and various kinds of information. An out-finder display unit 43 is a display unit provided on a top surface of the camera 100, and displays various setting values of the camera 100 including a shutter speed and an aperture. A shutter button 61 is an operation member for issuing an imaging instruction. A mode selection switch 60 is an operation member for switching various kinds of modes. A terminal cover 40 is a cover for protecting a connector (not illustrated) to which a connector of a connection cable used for connecting an external apparatus to the digital camera 100 is attached. A main electronic dial 71 is a rotational operation member included in an operation unit 70, and a user can, for example, change the setting values, such as the shutter speed and the aperture value, by rotating this main electronic dial 71. A power switch 72 is an operation member for switching a power source of the digital camera 100 to ON or OFF. A sub electronic dial 73 is included in the operation unit 70, and is a rotational operation member included in the operation unit 70. The sub electronic dial 73 allows the user to, for example, move a selection frame and skip to a subsequent image (image forwarding operation). A cross key 74 is included in the operation unit 70, and is a cross key (a four-directional key) including an up portion, a down portion, a left portion, and a right portion that can be individually pressed. The cross key 74 allows the user to perform an operation according to the pressed portion. A SET button 75 is included in the operation unit 70, and is a pressing button. The SET button 75 is mainly used to, for example, determine a selected item. A live view (LV) button 76 is included in the operation unit 70, and is a button for switching a live view (hereinafter referred to as an LV) to ON or OFF in a still image capturing mode. The LV button 76 is used to instruct the digital camera 100 to start or stop capturing (recording) a moving image in a moving image capturing mode. An enlargement button 77 is included in the operation unit 70, and is an operation button for switching an enlargement mode to ON or OFF in a live view display in an imaging mode, and changing an enlargement ratio in an enlargement mode. The enlargement button 77 functions as an enlargement button for enlarging a playback image and increasing the enlargement ratio in a playback mode. A reduction button 78 is included in the operation unit 70, and is a button for reducing the enlargement ratio of the enlarged playback image to reduce the size of the displayed image. A playback button 79 is included in the operation unit 70, and is an operation button for switching the imaging mode and the playback mode. Pressing the playback button 79 while the digital camera 100 is in the imaging mode causes the digital camera 100 to transition to the playback mode, and allows the digital camera 100 to display the latest image among images recorded in a recording medium 200 on the display unit 28. A quick-return mirror 12 is instructed by a system control unit 50 to be flipped up and down by an actuator (not illustrated). A communication terminal 10 is a communication terminal used for the digital camera 100 to communicate with a lens side (attachable to and detachable from the digital camera 100). An eyepiece finder 16 is a finder configured to be looked into, which is usable to confirm a focus and a composition of an optical image of a subject that is acquired via a lens unit 150 by observing a focusing screen 13. A cover 202 is a cover of a slot where the recording medium 200 is stored. A grip portion 90 is a holding portion shaped so as to allow the user to easily grip it with the user's right hand when holding the digital camera 100.

Figure 2:
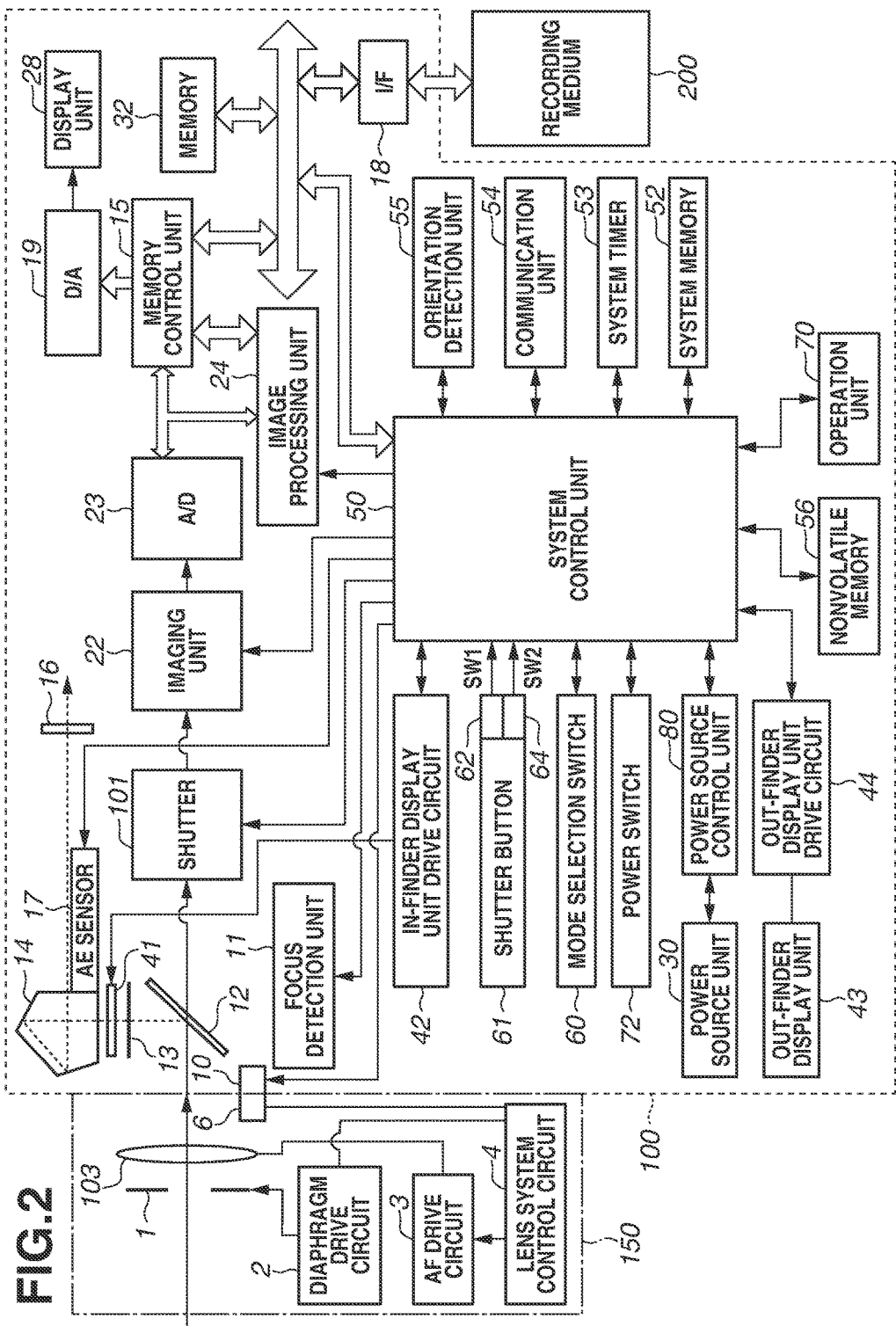
FIG. 2 is a block diagram illustrating a configuration of the digital camera.

FIG. 2 is a block diagram illustrating an example of a configuration of the digital camera 100 according to the present exemplary embodiment.

In FIG. 2, the lens unit 150 is a lens unit with a replaceable imaging lens mounted thereon.

A lens 103 is normally formed of a plurality of lenses, but is illustrated as being only one lens in FIG. 2 for the purpose of simplification. A communication terminal 6 is a communication terminal used for the lens unit 150 to communicate with the digital camera 100 side, and the communication terminal 10 is the communication terminal used for the digital camera 100 to communicate with the lens unit 150 side. The lens unit 150 allows the digital camera 100 to be focused by communicating with the system control unit 50 via these communication terminals 6 and 10, controlling a diaphragm 1 via a diaphragm drive circuit 2 by an internally provided lens system control circuit 4, and displacing a position of the lens 103 via an autofocus (AF) drive circuit 3.

An automatic exposure (AE) sensor 17 measures light to detect a luminance of the subject that is acquired via the lens unit 150.

A focus detection unit 11 outputs defocus amount information to the system control unit 50. The system control unit 50 controls the lens unit 150 based on this defocus amount information to conduct phase difference AF.

The quick-return mirror 12 (hereinafter referred to as mirror 12) is instructed by the system control unit to be flipped up and down by the actuator (not illustrated) at the time of an exposure, capturing an image for the live view, and capturing a moving image. The mirror 12 is a mirror for switching a light flux incident from the lens 103 between a finder 16 side and an imaging unit 22 side. The mirror 12 is disposed so as to reflect the light flux to guide the light flux to the finder 16 at a normal state. However, when the image is captured or the live view is displayed, the mirror 12 is flipped up so as to guide the light flux to the imaging unit 22, thereby being retracted from inside the light flux (mirror lock-up). Further, the mirror 12 is configured as a half mirror at a central portion thereof so as to permit the light to be partially transmitted therethrough, and allows the light flux to be partially transmitted therethrough so as to be incident on the focus detection unit 11 for carrying out focus detection.

The user of the digital camera 100 can confirm the focus and the composition of the optical image of the subject acquired via the lens unit 150 by observing the focusing screen 13 via a pentaprism 14 and the finder 16.

A shutter 101 is a focal plane shutter capable of freely controlling an exposure time period of the imaging unit 22 under control by the system control unit 50.

The imaging unit 22 is an image sensor constituted with use of, for example, a charge coupled device (CCD) or complementary metal-oxide semiconductor (CMOS) element, which converts an optical image into an electric signal. An analog-to-digital (A/D) converter 23 converts an analog signal into a digital signal. The A/D converter 23 is used to convert an analog signal output from the imaging unit 22 into a digital signal.

An image processing unit 24 performs predetermined pixel interpolation, resizing processing such as a reduction, and color conversion processing on the data received from the A/D converter 23 or data from a memory control unit 15. Further, the image processing unit 24 performs predetermined calculation processing with use of the captured image data, and the system control unit 50 controls the exposure and ranging based on an acquired result of the calculation. Based on this control, the digital camera 100 performs AF processing, AE processing, and flash preliminary emission (EF) processing of the Through-The-Lens (TTL) method. The image processing unit further performs predetermined calculation processing with use of the captured image data, and the digital camera 100 also performs automatic white balance (AWB) processing of the TTL method based on an acquired result of the calculation.

The output data from the A/D convertor 23 is written into a memory 32 via the image processing unit 24 and the memory control unit 15, or is directly written into the memory 32 via the memory control unit 15. The memory 32 stores the image data acquired by the imaging unit 22 and converted into the digital data by the A/D converter 23, and image data to be displayed on the display unit 28. The memory 32 has a storage capacity sufficient to store a predetermined number of still images, or a moving image and audio data for a predetermined time period.

Further, the memory 32 also serves as a memory for the image display (a video memory). A digital-to-analog (D/A) converter 19 converts the data for the image display that is stored in the memory 32 into an analog signal, and provides the converted data to the display unit 28. In this manner, the image data for the display that is written in the memory 32 is displayed by the display unit 28 via the D/A converter 19. The display unit 28 presents a display according to the analog signal from the D/A converter 19 on a display device, such as a liquid crystal display (LCD). The digital camera 100 can provide a function as an electronic viewfinder and realize a through-image display (live view display) by converting the digital signal that has been converted from the analog signal by the A/D converter 23 and then stored into the memory 23 into the analog signal by the D/A converter 19, sequentially transferring the analog signal to the display unit 28 to display the transferred analog signal.

A frame indicating a focusing point on which the autofocus is currently conducted (AF frame), an icon indicating a setting state of the camera 100, and the like are displayed on an in-finder liquid crystal display unit 41 via an in-finder display unit drive circuit 42.

The various setting values of the camera 100 including the shutter speed and the aperture value are displayed on the out-finder display unit 43 via an out-finder display unit drive circuit 44.

A nonvolatile memory 56 is an electrically erasable and recordable memory, and, for example, an electrically erasable programmable read only memory (EEPROM) is used as the nonvolatile memory 56. The nonvolatile memory 56 stores constants, programs, and the like for operating the system control unit 50. The programs described here refer to programs for performing various kinds of flowcharts that will be described below in the present exemplary embodiment.

The system control unit 50 is a control unit including at least one processor, and controls the entire digital camera 100. The system control unit 50 realizes each processing procedure in the present exemplary embodiment (described below) by executing the above-described programs recorded in the nonvolatile memory 56. The digital camera 100 further includes a system memory 52, and, for example, a random access memory (RAM) is used as the system memory 52. The constants and variables for operating the system control unit 50, the programs read out from the nonvolatile memory 56, and the like are loaded into the system memory 52. Further, the system control unit 50 also performs display control by controlling the memory 32, the D/A converter 19, the display unit 28, and the like.

A system timer 53 is a time measurement unit that measures a time period for use in various kinds of control, and a time of a built-in clock.

The mode selection switch 60, a first shutter switch 62, a second shutter switch 64, and the operation unit 70 are operation units for inputting various kinds of operation instructions to the system control unit 50.

The mode selection switch 60 switches an operation mode of the system control unit 50 to any of a still image recording mode, the moving image capturing mode, the playback mode, and the like. Modes contained in the still image recording mode include an automatic imaging mode, an automatic scene determination mode, a manual mode, an aperture priority mode (aperture value (Av) mode), and a shutter speed priority mode (time value (Tv) mode). Further, the modes contained in the still image recording mode include various kinds of scene modes each corresponding to an imaging setting prepared for each imaging scene, a program AE mode, a custom mode. The user can directly switch the operation mode to any of these modes with use of the mode selection switch 60. Alternatively, the user may first switch the digital camera 100 to a screen displaying a list of the imaging modes with use of the mode selection switch 60, and, after that, select any of the plurality of displayed modes and switch the operation mode with use of another operation member. Similarly, the moving image capturing mode may also include a plurality of modes.

The first shutter switch 62 is switched on halfway through an operation of the shutter button 61, which is an imaging operation member provided on the digital camera 100, i.e., switched on upon a so-called half-press of the shutter button 61 (a first operation/instruction to prepare to capture the image), and generates a first shutter switch signal SW1. In response to the first shutter switch signal SW1, the system control unit 50 starts an operation of imaging preparation processing, such as the AF processing, the AE processing, the AWB processing, and the EF processing.

The second shutter switch 64 is switched on upon completion of the operation of the shutter button 61, i.e., switched on upon a so-called full-press of the shutter button 61 (a second operation/instruction to capture the image), and generates a second shutter switch signal SW2. In response to the second shutter switch signal SW2, the system control unit 50 starts a series of imaging processing operations from reading out the signal from the imaging unit 22 to writing the image data into the recording medium 200.

The individual operation members of the operation unit 70 are appropriately assigned functions for each scene and work as various kinds of functional buttons, by, for example, execution of an operation for selecting various kinds of functional icons displayed on the display unit 28. Examples of the functional buttons include an end button, a return button, an image forwarding button, a jump button, a depth-of-field preview button, and an attribute change button. For example, when a menu button 70e is pressed, a menu screen where various kinds of settings can be made is displayed on the display unit 28. The user can intuitively make the various kinds of settings by using the menu screen displayed on the display unit 28, the "up, down, left, and right four-directional button" 74, and the SET button 75.

The operation unit 70 includes various kinds of operation members as an input unit that receives an operation from the user. The operation unit 70 includes at least the following operation units: the shutter button 61, the main electronic dial 71, the power switch 72, the sub electronic dial 73, the cross key 74, the SET button 75, the LV button 76, the enlargement button 77, the reduction button 78, and the playback button 79. The cross key 74 is a directional button that allows each of the up, down, right, and left portions of the cross key 74 to be pressed in. In the present exemplary embodiment, the cross key 74 has been described as an integrated operation unit, but each of the up button, the down button, the right button, and the left button may be an independent button. In the following description, the up or down portion, and the left or right portion will be referred to as an up/down key and a left/right key, respectively. Further, the operation unit 70 also includes the following operation units.

An AF-ON button 70b is a pressing button switch included in the operation unit 70, and the user can instruct the digital camera 100 to conduct the AF operation by pressing the AF-ON button 70b. The AF-ON button 70b is pressed in a direction parallel with a direction (optical axis) of subject light incident from the lens 103 on the imaging unit 22.

A quick setting button 70c (hereinafter referred to as a Q button 70c) is a pressing button switch included in the operation unit 70, and a quick setting menu, which is a list of setting items settable in each operation mode, is displayed by pressing the Q button 70c. For example, when the Q button 70c is pressed while the digital camera 100 is on standby for the imaging in the live view imaging, a list of setting items such as an electronic front curtain shutter, brightness of a monitor, WB of an LV screen, a 2-area enlargement, and silent imaging is displayed in one row in a state of being superimposed on the LV. The user can change a setting regarding a selected setting item and transition to an operation mode by selecting an arbitrary option in the displayed quick setting menu with use of the up/down key and pressing the SET button 75.

An active frame switching button 70d is a pressing button switch included in the operation unit 70, and the user can switch an active enlarged position (frame) between two enlarged portions by pressing the active frame switching button 70d in 2-area enlargement processing, which will be described below. Further, a different function is assigned thereto depending on the operation mode, and the user can add a protected attribute to a displayed image by pressing this button in the playback mode.

The menu button 70e is a pressing button switch included in the operation unit 70, and the menu screen where the various kinds of settings can be made is displayed on the display unit 28.

Functional buttons 70f are three pressing button switches included in the operation unit 70, and a function is assigned to each of them. Each of the functional buttons 70f is disposed at a position that allows a finger (middle finger, ring finger, or little finger) of the right hand holding the grip portion 90 to operate the functional button 70f, and is pressed in the direction parallel with the direction (optical axis) of the subject light incident from the lens 103 on the imaging unit 22.

A power source control unit 80 includes a battery detection circuit, a direct-current-to-direct-current (DC-DC) converter, a switching circuit that switches a block to which power is supplied, and detects whether a battery is mounted, a type of the battery, and a remaining battery level. Further, the power source control unit 80 controls the DC-DC converter and supplies a required voltage to each of the units including the recording medium 200 for a required time period based on a result of this detection and an instruction from the system control unit 50.

A power source unit 30 includes a primary battery such as an alkaline battery and a lithium battery, a secondary battery such as a nickel-cadmium (NiCd) battery, a nickel metal hydride (NiMH) battery, and a lithium (Li) battery, an alternating-current (AC) adapter. A recording medium interface (I/F) 18 is an interface with the recording medium 200, such as a memory card and a hard disk. The recording medium 200 is a recording medium for recording the captured image, such as a memory card, and is constructed with use of a semiconductor memory, a magnetic disk, or the like.

A communication unit 54 is connected wirelessly or via a cable for a wired connection, and transmits and receives a video signal and an audio signal. The communication unit 54 can also be connected to a wireless local area network (LAN) or the Internet. The communication unit 54 can transmit the image captured by the imaging unit 22 (including the through-image) and the image recorded in the recording medium 200, and, further, can receive image data and other various kinds of information from an external apparatus.

An orientation detection unit 55 detects an orientation of the digital camera 100 with respect to a direction of gravitational force. It can be determined whether the image captured by the imaging unit 22 is an image captured with the digital camera 100 held in a landscape orientation or an image captured with the digital camera 100 held in a portrait orientation based on the orientation detected by the orientation detection unit 55. The system control unit 50 can add orientation information according to the orientation detected by the orientation detection unit 55 to an image file of the image captured by the imaging unit 22, and record the image after rotating the image. An acceleration sensor, a gyroscope sensor, or the like can be used as the orientation detection unit 55.

The digital camera 100 includes the touch panel 70a that can detect a touch on the display unit 28 as one element of the operation unit 70. The touch panel 70a and the display unit 28 can be configured integrally with each other. For example, the touch panel 70a is configured in such a manner that an optical transmittance thereof does not disturb the display on the display unit 28, and is mounted on an upper layer of a display surface of the display unit 28. Then, an input coordinate on the touch panel 70a and a display coordinate on the display unit 28 are associated with each other. This configuration can construct a graphical user interface (GUI) that appears as if the user can directly operate a screen displayed on the display unit 28. The system control unit 50 can detect the following operations on the touch panel 70a or states of the touch panel 70a.

- A finger or a pen that has not touched the touch panel 70a newly touches the touch panel 70a. In other words, the touch is started (hereinafter referred to as a Touch-Down).
- The touch panel 70a is being touched by the finger or the pen (hereinafter referred to as a Touch-On).
- The finger or the pen is being moved while keeping touching the touch panel 70a (hereinafter referred to as a Touch-Move).
- The finger or the pen that has been in touch with the touch panel 70a is separated from the touch panel 70a. In other words, the touch is ended (hereinafter referred to as a Touch-Up).
- The touch-panel 70a is not touched by the finger or the pen (hereinafter referred to as a Touch-Off).

When the Touch-Down is detected, a start of the Touch-On is also detected at the same time. After the Touch-Down, the detection of the Touch-On normally continues unless the Touch-Up is detected. The Touch-Move is detected in a state where the Touch-On is also detected. Even when the Touch-On is detected, the Touch-Move is not detected unless a touched position is being moved. After detection of the Touch-Up of all of the fingers (finger) or the pens (pen) that have been in touch with the touch panel 70a, the touch panel 70a transitions to the Touch-Off.

The system control unit 50 is notified of these operations/states and a coordinate of the position touched by the finger or the pen on the touch panel 70a via an internal bus, and determines what kind of touch operation is performed on the touch panel 70a based on the information that the system control unit 50 is notified of. Regarding the Touch-Move, the system control unit 50 can also determine a movement direction of the finger or the pen being moved on the touch panel 70a based on a change in the coordinate of the position for each of a vertical component and a horizontal component on the touch panel 70a. Assume that the system control unit 50 determines that a slide operation is performed when detecting that the Touch-Move is performed by a predetermined distance or longer. An operation of quickly moving the finger only by a certain distance while keeping the finger in touch on the touch panel 70a, and separating the finger from the touch panel 70a directly therefrom will be referred to as a flick. In other words, the flick is an operation of quickly running the finger on the touch panel 70a as if flicking on the touch panel 70a with the finger. The system control unit 50 can determine that the flick is performed when detecting that the Touch-Move is performed by a predetermined distance or longer at a predetermined speed or higher and detecting the Touch-Up directly therefrom (can determine that the flick is performed subsequently to the slide operation). Further, a touch operation of touching a plurality of portions (e.g., two points) at the same time and moving the respective touched positions toward each other will be referred to as a pinch-in, and a touch operation of moving the respective touched positions away from each other will be referred to as a pinch-out. The pinch-in and the pinch-out will be collectively referred to as a pinch operation (or simply a pinch). The touch panel 70a may be embodied by employing any type of touch panel among touch panels based on various methods, such as a resistive film method, a capacitive method, a surface acoustic wave method, an infrared method, an electromagnetic induction method, an image recognition method, and an optical sensor method. Employable detection methods include a method that detects that the touch is input when the touch panel 70a is touched, and a method that detects that the touch is input when the finger or the pen just approaches the touch panel 70a, depending the type of the touch panel 70a, and the touch panel 70a may be embodied by employing any method of them.

Figure 3:
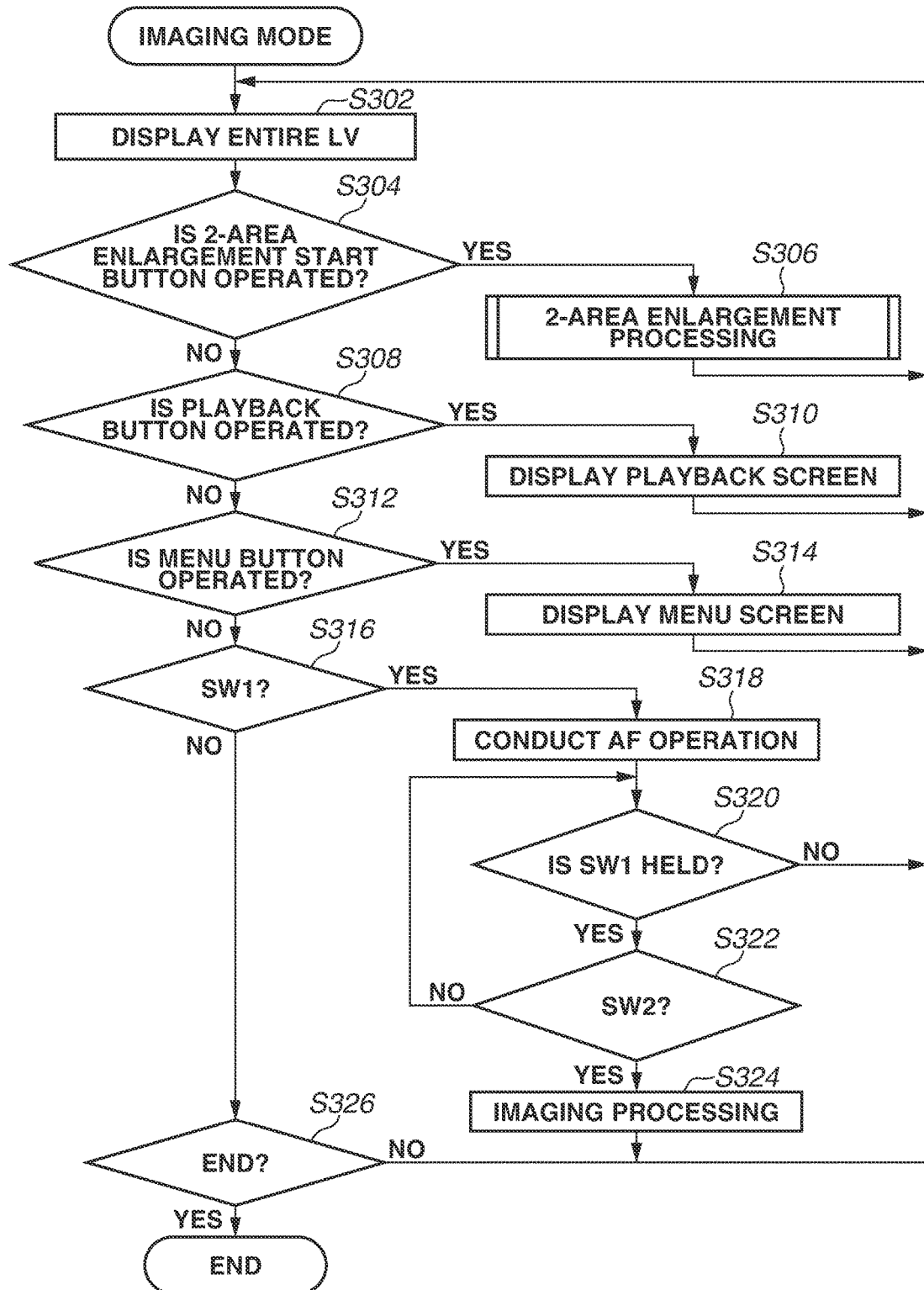
FIG. 3 is a flowchart illustrating processing in a live view (LV) imaging mode.

FIG. 3 is a flowchart illustrating a flow of processing in the live view imaging mode in the digital camera 100. The program recorded in the nonvolatile memory 56 is loaded into the system memory 52 and executed by the system control unit 50, by which this processing is realized. When the digital camera 100 is started up in the imaging mode and the live view imaging (the LV imaging) is turned on, the processing illustrated in FIG. 3 is started. The digital camera 100 can also capture the image in an imaging mode other than the LV imaging mode, but a description in this case will be omitted.

In step S302, the system control unit 50 displays the live view image (LV image) captured by the imaging unit 22 on the display unit 28. The LV image displayed at this time is an entire live view image containing an entire imaging range (range contained in the captured image to be recorded as the image file).

In step S304, the system control unit 50 determines whether the quick setting button 70c is operated and an item indicating the 2-area enlargement (2-area zoom) is selected. If the item indicating the 2-area enlargement is selected (YES in step S304), the processing proceeds to step S306. If not (NO in step S304), the processing proceeds to step S308.

In step S306, the system control unit 50 starts the 2-area enlargement processing. The 2-area enlargement processing will be described below with reference to FIG. 4.

In step S308, the system control unit 50 determines whether the playback button 79 is operated. If the playback button 79 is operated (YES in step S308), the processing proceeds to step S310. If not (NO in step S308), the processing proceeds to step S312.

In step S310, the system control unit 50 reads the image from the recording medium 200, and starts the playback mode of displaying the image on the display unit 28. A detailed description of processing in the playback mode will be omitted herein. After the system control unit 50 ends the playback processing in the playback mode and returns to the LV imaging mode again, the processing proceeds to step S302.

In step S312, the system control unit 50 determines whether the menu button 70e is operated. If the menu button 70e is operated (YES in step S312), the processing proceeds to step S314. If not (NO in step S312), the processing proceeds to step S316.

In step S314, the system control unit 50 displays the menu screen where the various kinds of settings can be made on the display unit 28, and receives various kinds of setting operations from the user. Assume that there is a setting item of automatic rotation detection for the 2-area enlargement display as one of a plurality of setting items displayed on the menu screen. This setting item allows at least whether to enable (turn on) or disable (turn off) the automatic rotation detection for the 2-area enlargement display to be set according to a selection operation from the user. A set content is recorded into the nonvolatile memory 56. If the automatic rotation detection for the 2-area enlargement display is enabled (turned on), the system control unit 50 atomically switches whether to present the two-enlargement display in a left/right arrangement or in an up/down arrangement according to the orientation of the digital camera 100, as will be described below. More specifically, the 2-area enlargement display is presented in the left/right arrangement if the 2-area enlargement display is started when the digital camera 100 is in the landscape orientation (normal orientation), and is presented in the up/down arrangement if being started when the digital camera 100 is in the portrait orientation (vertical orientation). If the automatic rotation detection for the 2-area enlargement display is set to the disablement (OFF), the 2-area enlargement display is presented in the left/right arrangement when the 2-area enlargement display is started regardless of the orientation of the digital camera 100.

In step S316, the system control unit 50 determines whether the shutter button 61 is half pressed and SW1 is turned on. If SW1 is turned on (YES in step S316), the processing proceeds to step S318. If not (NO in step S316), the processing proceeds to step S326.

In step S318, the system control unit 50 conducts the AF operation on a current AF position. After the digital camera 100 is focused as a result of the AF, the focus is fixed (AF lock) while SW1 is kept turned on.

In step S320, the system control unit 50 determines whether SW1 is kept turned on. If SW1 is kept turned on (YES in step S320), the processing proceeds to step S322. If not (NO in step S320), the system control unit 50 releases the AF lock state and the processing proceeds to step S302.

In step S322, the system control unit 50 determines whether the shutter button 61 is fully pressed and SW2 is turned on. If SW2 is turned on (YES in step S322), the processing proceeds to step S324. If not (NO in step S322), the processing proceeds to step S320.

In step S324, the system control unit 50 performs the above-described imaging processing (series of imaging processing operations from reading the signal from the imaging unit 22 to writing the image file into the recording medium 200) according to SW2 being turned on. The image captured by the imaging processing is an image of the entire imaging range. After the imaging processing is ended, the processing proceeds to step S302.

In step S326, the system control unit 50 determines whether an end event has occurred. If the end event has occurred (YES in step S326), the system control unit 50 ends the imaging mode processing. If not (NO in step S326), the processing returns to step S302 to repeat the processes. Assume that examples of the end event include power-off, and an end of the LV imaging mode (switching to a mode of capturing the image via an optical finder).

Next, display processing and an end condition in the 2-area enlargement processing will be described with reference to a flowchart illustrated in FIG. 4 and image display examples illustrated in FIGS. 7A1, 7A2, and 7B to 7G, and 8A1, 8A2, 8A3, and 8B to 8E.

Figure 4:
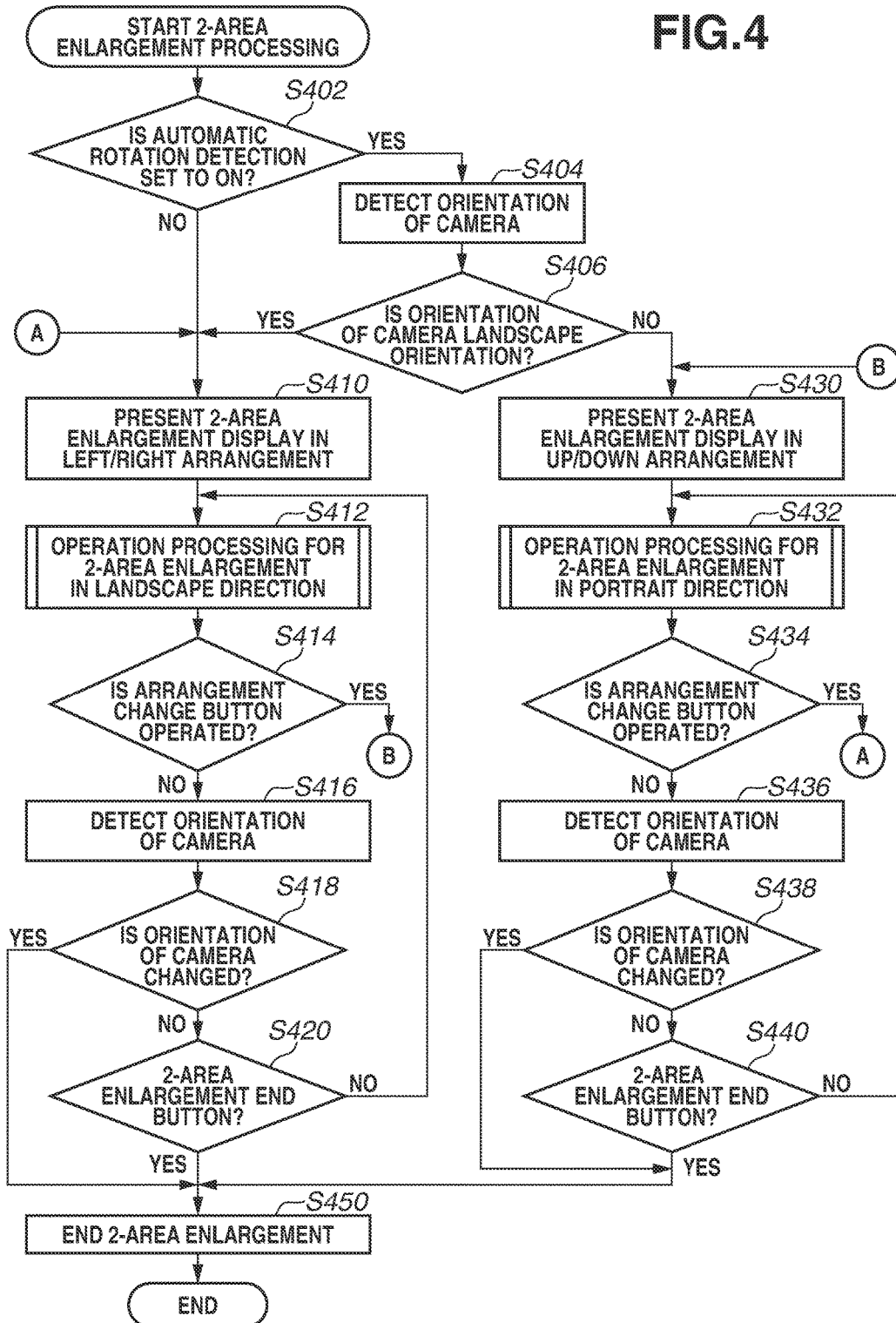
FIG. 4 is a flowchart illustrating 2-area enlargement processing.

FIG. 4 is a flowchart illustrating details of the 2-area enlargement processing in step S306 described above. The program recorded in the nonvolatile memory 56 is loaded into the system memory 52 and executed by the system control unit 50, by which this processing is realized.

In step S402, the system control unit 50 determines whether the setting of the automatic rotation detection is set to ON. The setting of the automatic rotation detection is one of the various kinds of settings settable on the menu screen, and allows the user to set whether to switch the 2-area enlargement display in the left/right arrangement and the 2-area enlargement display in the up/down arrangement, which will be described below, according to the orientation of the camera 100 when the 2-area enlargement is started. If the setting of the automatic rotation detection is set to ON (YES in step S402), the processing proceeds to step S404. If not (NO in step S402), the processing proceeds to step S410.

In steps S404 and S406, the system control unit 50 determines whether the orientation of the camera 100 is the landscape orientation (i.e., normal orientation or regular orientation) from orientation information transmitted from the orientation detection unit 55. If the orientation detection unit 55 detects that a left/right direction (X-axis direction) of the camera 100 or a left/right direction (X-axis direction) of the imaging unit 22 extends at a predetermined angle or smaller (e.g., 45 degrees or smaller) from a direction (horizontal direction) perpendicular to the direction of gravitational force, the system control unit 50 determines that the orientation of the camera 100 is the landscape orientation (i.e., normal orientation or first orientation). On the other hand, if the orientation detection unit 55 detects that an up/down direction (Y-axis direction) of the camera 100 or an up/down direction (Y-axis direction) of the imaging unit 22 extends at a predetermined angle or smaller (e.g., 45 degrees or smaller) from the direction (i.e., horizontal direction) perpendicular to the direction of gravitational force, the system control unit 50 determines that the orientation of the camera 100 is the portrait orientation (second orientation different from the first orientation by 90 degrees). In other words, if the orientation detection unit 55 detects that the left/right direction (X-axis direction) of the camera 100 or the left/right direction (X-axis direction) of the imaging unit 22 extends at a predetermined angle or smaller (e.g., 45 degrees or smaller) from the direction of gravitational force, the system control unit 50 determines that the orientation of the camera 100 is the portrait orientation (second orientation different from first orientation by 90 degrees). The determination method is not limited to the above-described method as long as the method can determine whether the digital camera 100 is in the landscape orientation of being held in a landscape manner or in the portrait orientation of being held in a portrait manner. Types of the portrait orientation include a portrait orientation 1 rotated from the landscape orientation rightward by 90 degrees and a portrait orientation 2 rotated from the landscape orientation leftward by 90 degrees, and the orientation detection unit 55 can detect which orientation the portrait orientation of the digital camera 100 is. Assume that similar processing is basically performed in these two portrait orientations except for processing that would be affected by a reversal of the left and the right of each of them. If the orientation of the camera 100 is the landscape orientation (YES in step S406), the processing proceeds to step S410. If not (if the orientation of the camera 100 is the portrait orientation 1 or the portrait orientation 2) (NO in step S406), the processing proceeds to step S430. Processing in step S430 and steps subsequent thereto will be described focusing on processing in the case where the orientation of the digital camera 100 is the portrait orientation 1 by way of example. In the case of the portrait orientation 2, displays other than the live view image are presented as displays rotated by 180 degrees compared to the portrait orientation 1, which will be described below, but, except for that, similar processing to the processing in the case of the portrait orientation 1 is basically performed (the live view image is displayed in an unchanged direction), although a detailed description thereof will be omitted herein.

In step S410, the system control unit 50 presents the 2-area enlargement display in the left/right arrangement on the display unit 28. The 2-area enlargement display in the left/right arrangement will be described with reference to FIGS. 7A1 and 7A2.

FIG. 7A1 is a conceptual diagram illustrating display ranges in the 2-area enlargement display in the left/right arrangement. A whole LV image 700 indicates the entire LV image (whole LV image) captured by the imaging unit 22, and the LV image in this range is displayed in the whole LV display in step S302. A building is imaged in the whole LV image 700 as an example of the subject. Coordinate axes CA indicate the left/right direction of the digital camera 100 or the imaging unit 22 as an X axis, and the up/down direction of the digital camera 100 or the imaging unit 22 as a Y axis. The coordinate axes CA are illustrated in each of the drawings for the purpose of convenience, and are not displayed. Hereinafter, a direction in which an X coordinate increases (X positive direction) will be referred to as a "right" of the digital camera 100, and a direction in which an X coordinate reduces (X negative direction) will be referred to as a "left" of the digital camera 100. Assume that a direction in which a Y coordinate increases (Y positive direction) will be referred to as "down" or a "lower side" of the digital camera 100, and a direction in which a Y coordinate reduces (Y negative direction) will be referred to as "up" or an "upper side" of the digital camera 100. On the other hand, the up, down, left, and right directions with reference to the direction of gravitational force are different from the up, down, left, and right directions of the digital camera 100 when the digital camera 100 is in the portrait orientation. However, hereinafter, when the terms "up" or "upper side", "down" or "lower side", "left, and "right" are used, they shall mean the "up" or "upper side, "down" or "lower side", "left", and "right" of the digital camera 100 unless otherwise indicated especially. In the 2-area enlargement display in the left/right arrangement, the displayed range is not the entire whole LV image 700 but is ranges of a left-side region 701 and a right-side region 702 that are regions different in the left/right direction in the whole LV image 700 (ranges captured at regions in the imaging unit 22 that correspond to the left-side region 701 and the right-side region 702).

FIG. 7A2 illustrates a display example of the 2-area enlargement display in the left/right arrangement. In the 2-area enlargement display in the left/right arrangement, the live view images of the two regions separated in the left/right direction (i.e., horizontal direction or width direction) are displayed while being arranged on one screen. A left-side region 710 is a display region displaying a live view image captured at a partial region on a left side of the imaging unit 22. A right-side region 712 is a display region displaying a live view image captured at a partial region on a right side of the imaging unit 22. Ranges of the left-side region 701 and the right-side region 702 in the whole LV image 700 illustrated in FIG. 7A1 (ranges captured at the regions in the imaging unit 22 that correspond to the left-side region 701 and the right-side region 702) are displayed in the left-side region 710 and the right-side region 712, respectively. The live view images displayed in the left-side region 710 and the right-side region 712 are regions in the imaging unit 22 that are located at the same height (same Y coordinate). An active frame 714 is a selection frame indicating one of the left-side region 710 and the right-side region 712 that is a region currently targeted for an operation (active region). In FIG. 7A2, the active frame 714 is placed at the left-side region 710, and the left-side region 710 is targeted for a leftward or rightward movement, the AF operation, and the like. A guide 722 is a guidance display indicating an operation member (operation method) for ending the 2-area enlargement. A guide 724 is a guidance display indicating an operation member (operation method) for switching the region on which the active frame 714 is displayed. An enlarged position guide 716 is a guide indicating portions displayed in an enlarged manner in the left-side region 710 and the right-side region 712 in the entire imaging range (the entire live view image being captured by the imaging unit 22 or the entire imaging range contained in the still image to be captured according to the imaging instruction). In other words, the enlarged position guide 716 is a guide indicating positions and sizes of two imaging regions corresponding to the left-side region 710 and the right-side region 712 with respect to the entire imaging range. A left-side indicator 718 indicates a range of the live view image that is displayed in the left-side region 710 with respect to the entire imaging range. A right-side indicator 720 indicates a range of the live view image that is displayed in the right-side region 712 with respect to the entire imaging range. The left-side indicator 718 is displayed in a different color or with a different line width from the right-side indicator 720 so as to indicate that the active frame 714 is placed on the left-side region 710. The guide 722, the guide 724, and the enlarged position guide 716 are displayed in a state of being superimposed on the live view image in the region without the active frame 714 placed thereon (an inactive region) so as not to impede visual confirmation of the live view image in the active region.

In step S412, the system control unit 50 performs operation processing when the orientation of the camera 100 is in the landscape direction in the 2-area enlargement. The operation processing when the orientation of the camera 100 is in the landscape direction will be described below with reference to FIG. 5.

In step S414, the system control unit 50 determines whether an arrangement change button of the 2-area enlargement is performed. The arrangement change button (specific operation member) is the functional button 70f in the present exemplary embodiment. If the arrangement change button is operated (YES in step S414), the processing proceeds to step S430. If not (NO in step S414), the processing proceeds to step S416. In this manner, when the arrangement change button is received due to the user operation, the processing proceeds to step S416, i.e., the display is switched to the 2-area enlargement in the up/down arrangement and the display can be switched when the current arrangement is not an arrangement desired by the user. After the start of the 2-area enlargement, the arrangement is not automatically changed due to, for example, the detection of the orientation by the camera 100 unless the operation is performed onto the operation member by the user. Therefore, in a case where the 2-area enlargement display in the left/right arrangement is presented, the display is not switched to the 2-area enlargement display in the up/down arrangement even when the orientation of the camera 100 is changed from the landscape orientation to the portrait orientation. This is because the positions and the sizes (aspect ratios) of the displayed ranges are different between the 2-area enlargement in the left/right arrangement and the 2-area enlargement in the up/down arrangement, whereby switching the display between the 2-area enlargement display in the left/right arrangement and the 2-area enlargement display in the up/down arrangement leads to an unintentional change in a visible range of the displayed live view image. The display is not directly switched between the 2-area enlargement display in the left/right arrangement and the 2-area enlargement display in the up/down arrangement so as to prevent the user from being thrown into such confusion that the range displayed in the 2-area enlargement is unintentionally switched between the landscape orientation and the portrait orientation and the user loses track of where is displayed. In steps S416 and S418, the system control unit 50 determines from the orientation information transmitted from the orientation detection unit 55 whether the orientation of the camera 100 is changed from when the 2-area enlargement is started in a manner satisfying a predetermined condition. If the system control unit 50 determines that the orientation of the digital camera 100 is changed (YES in step S418), the processing proceeds to step S450. If not (NO in step S418), the processing proceeds to step S420. The determination in step S418 may be a determination about whether the camera 100 is rotated into the portrait orientation, or the camera 100 does not necessarily have to be rotated as far as the portrait orientation and the determination in step S418 may be a determination about whether the camera 100 is brought into a state significantly changed from the landscape orientation. For example, if an angle between the left/right direction (X-axis direction) of the camera 100 or the left/right direction (X-axis direction) of the imaging unit 22 and the direction (horizontal direction) perpendicular to the direction of gravitational force exceeds a threshold angle (e.g., 30 degrees), the system control unit 50 can determine that the camera 100 is significantly changed from the landscape orientation (YES in step S418). Further, the system control unit 50 may be configured to refrain from determining YES in step S418 even if the camera 100 is brought into the state significantly changed from the landscape orientation as long as this change is a temporary change, and determine YES in step S418 if the camera 100 is kept in the state significantly changed from the landscape orientation for a predetermined time period.

In step S420, the system control unit 50 determines whether a 2-area enlargement end button is pressed. The 2-area enlargement end button is the Q button 70c in the present exemplary embodiment. If the Q button 70c is pressed (YES in step S420), the processing proceeds to step S450. If not (NO in step S420), the processing returns to step 412 to repeat the processes.

In step S450, the system control unit 50 ends the 2-area enlargement display and returns the display to the whole display of the live view image, thereby ending the 2-area enlargement processing. After the 2-area enlargement processing is ended, the processing proceeds to step S302 illustrated in FIG. 3 described above.

In step S430, the system control unit 50 presents the 2-area enlargement display in the up/down arrangement on the display unit 28. The 2-area enlargement display in the up/down arrangement will be described referring to an example when the digital camera 100 is brought into the portrait orientation rotated from the regular orientation rightward by 90 degrees with reference to FIGS. 8A1, 8A2, and 8A3.

FIG. 8A1 is a conceptual diagram illustrating display ranges in the 2-area enlargement display in the up/down arrangement. A whole LV image 800 indicates the entire LV image (whole LV image) captured by the imaging unit 22, and the LV image in this range is displayed in the whole LV display in step S302. FIG. 8A1 indicates the upper side (Y negative direction) of the digital camera 100 placed on an upper side of the diagram as indicated by the coordinate axes CA. In this example, the digital camera 100 is held in the portrait orientation rotated from the regular orientation rightward by 90 degrees, so that an upper side of the direction of gravitational force is located in the X negative direction. In the 2-area enlargement display in the up/down arrangement, the displayed range is ranges of an upper-side region 801 and a lower-side region 802 that are regions different in the up/down direction (up/down direction of the imaging unit 22) in the whole LV image 800 (ranges captured by regions in the imaging unit 22 that correspond to the upper-side region 801 and the lower-side region 802).

FIG. 8A2 illustrates a display example of the 2-area enlargement display in the up/down arrangement with the upper side of the digital camera 100 (upper side of the display unit 28) placed on the upper side of the diagram. FIG. 8A3 illustrates a display example similar to FIG. 8A2 with the upper side of the direction of gravitational force (left of the digital camera 100 and display unit 28) placed on the upper side of the diagram. When the upright user views the display unit 28, the user views the image in the orientation illustrated in FIG. 8A3. In the 2-area enlargement display in the up/down arrangement, live view images in two regions that are separated in the up/down direction in the imaging unit 22 (vertical direction or height direction) are displayed while being arranged on one screen. An upper-side region 810 is a display region displaying a live view image captured by a partial region on an upper side of the imaging unit 22. A lower-side region 812 is a display region displaying a live view image captured by a partial region on a lower side of the imaging unit 22. Ranges of the upper-side region 801 and the lower-side region 802 (ranges captured by the regions in the imaging unit 22 that correspond to the upper-side region 801 and the lower-side region 802) in the whole LV image 800 illustrated in FIG. 8A1 are displayed in the upper-side region 810 and the lower-side region 812, respectively. The live view images displayed in the upper-side region 810 and the lower-side region 812 are regions in the imaging unit 22 that are located at the same position in the width direction (X coordinate). An active frame 814 is a selection frame indicating one of the upper-side region 810 and the lower-side region 812 that is a region currently targeted for an operation (active region). In FIG. 8A2, the active frame 814 is placed on the lower-side region 812, and the lower-side region 812 is targeted for an upward/downward movement, the AF operation, and the like. A guide 822 is a guidance display indicating an operation member (operation method) for ending the 2-area enlargement. A guide 824 is a guidance display indicating an operation member (operation method) for switching the region on which the active frame 814 is displayed. An enlarged position guide 816 is a guide indicating portions displayed in an enlarged manner in the upper-side region 810 and the lower-side region 812 in the whole imaging range, i.e., entire live view image being captured by the imaging unit 22 or the entire imaging range contained in the still image to be captured according to the imaging instruction. In other words, the enlarged position guide 816 is a guide indicating positions and sizes of two imaging regions corresponding to the upper-side region 810 and the lower-side region 812 with respect to the entire imaging range. A lower-side indicator 818 indicates a range of the live view image that is displayed in the lower-side region 812 with respect to the entire imaging range. An upper-side indicator 820 indicates a range of the live view image that is displayed in the upper-side region 810 with respect to the entire imaging range. The lower-side indicator 818 is displayed in a different color or with a different line width from the upper-side indicator 820 so as to indicate that the active frame 814 is placed on the lower-side region 812. The guide 822, the guide 824, and the enlarged position guide 816 are displayed in a state of being superimposed on the live view image in the region without the active frame 814 placed thereon (inactive region) so as not to impede visual confirmation of the live view image in the active region. Further, a layout of icons representing the guide 822, the guide 824, and the enlarged position guide 816 is changed according to the direction in which the camera 100 is rotated into the portrait orientation so as to allow the user to be aware of the rotation orientation. Displaying the guide 822, the guide 824, and the enlarged position guide 816 on the right side of the display unit 28, as illustrated in FIGS. 8A2 and 8A3, allows the user to recognize the guide 822, the guide 824, and the enlarged position guide 816 when the camera 100 is rotated rightward by 90 degrees to be orientated in the portrait direction (the portrait orientation 1). When the camera 100 is rotated leftward by 90 degrees to be orientated in the portrait direction (portrait orientation 2), the guide 822, the guide 824, and the enlarged position guide 816 are rotated by 180 degrees from the layout in the case of the portrait orientation 1 and are displayed on the left side of the display unit 28. Further, the guide 722 and the guide 724 described with reference to FIG. 7A2 are arrayed in the left/right direction in terms of a display orientation (orientation of a character string in the guide). On the other hand, the guide 822 and the guide 824 illustrated in FIG. 8A3 are displayed in a state of being arrayed in the up/down direction in terms of the display orientation (orientation of the character string in the guide). In this manner, the layout of the displayed display items is also partially different between the 2-area enlargement display in the left/right arrangement and the 2-area enlargement display in the up/down arrangement.

In step S432, the system control unit 50 performs operation processing when the orientation of the camera 100 is in the portrait direction in the 2-area enlargement. The operation processing when the orientation of the camera 100 is in the portrait direction will be described below with reference to FIG. 6.

In step S434, the system control unit 50 determines whether the arrangement change button of the 2-area enlargement is operated. If the arrangement change button is operated (YES in step S434), the processing proceeds to step S410. If not (NO in step S434), the processing proceeds to step S436.

In steps S436 and S438, the system control unit 50 determines from the orientation information transmitted from the orientation detection unit 55 whether the orientation of the camera 100 is changed from when the 2-area enlargement is started in a manner satisfying a predetermined condition. If the system control unit 50 determines that the orientation of the camera 100 is changed (YES in step S438), the processing proceeds to step S450. If not (NO in step S438), the processing proceeds to step S440. The determination in step S438 may be a determination about whether the camera 100 is rotated into the landscape orientation, or the camera 100 does not necessarily have to be rotated as far as the landscape orientation and the determination in step S438 may be a determination about whether the camera 100 is brought into a state significantly changed from the portrait orientation. For example, if an angle between the left/right direction (X-axis direction) of the digital camera 100 or the left/right direction (X-axis direction) of the imaging unit and the direction of gravitational force exceeds a threshold angle (e.g., 30 degrees), the system control unit 50 can determine that the orientation of the camera 100 is significantly changed from the portrait orientation (YES in step S438). Further, the system control unit 50 may be configured to refrain from determining YES in step S438 even if the camera 100 is brought into the state significantly changed from the portrait orientation as long as this change is a temporary change, and determine YES in step S438 if the camera 100 is kept in the state significantly changed from the portrait orientation for a predetermined time period.

In step S440, the system control unit 50 determines whether the 2-area enlargement end button is pressed. If the Q button 70c is pressed (YES in step S440), the processing proceeds to step S450. If not (NO in step S440), the processing returns to step S432 to repeat the processes.

Next, the operation processing for the 2-area enlargement at the time of the left/right arrangement in the 2-area enlargement processing will be described with reference to a flowchart illustrated in FIG. 5 and the screen display examples illustrated in FIGS. 7A1, 7A2, and 7B to 7G.

Figure 5:
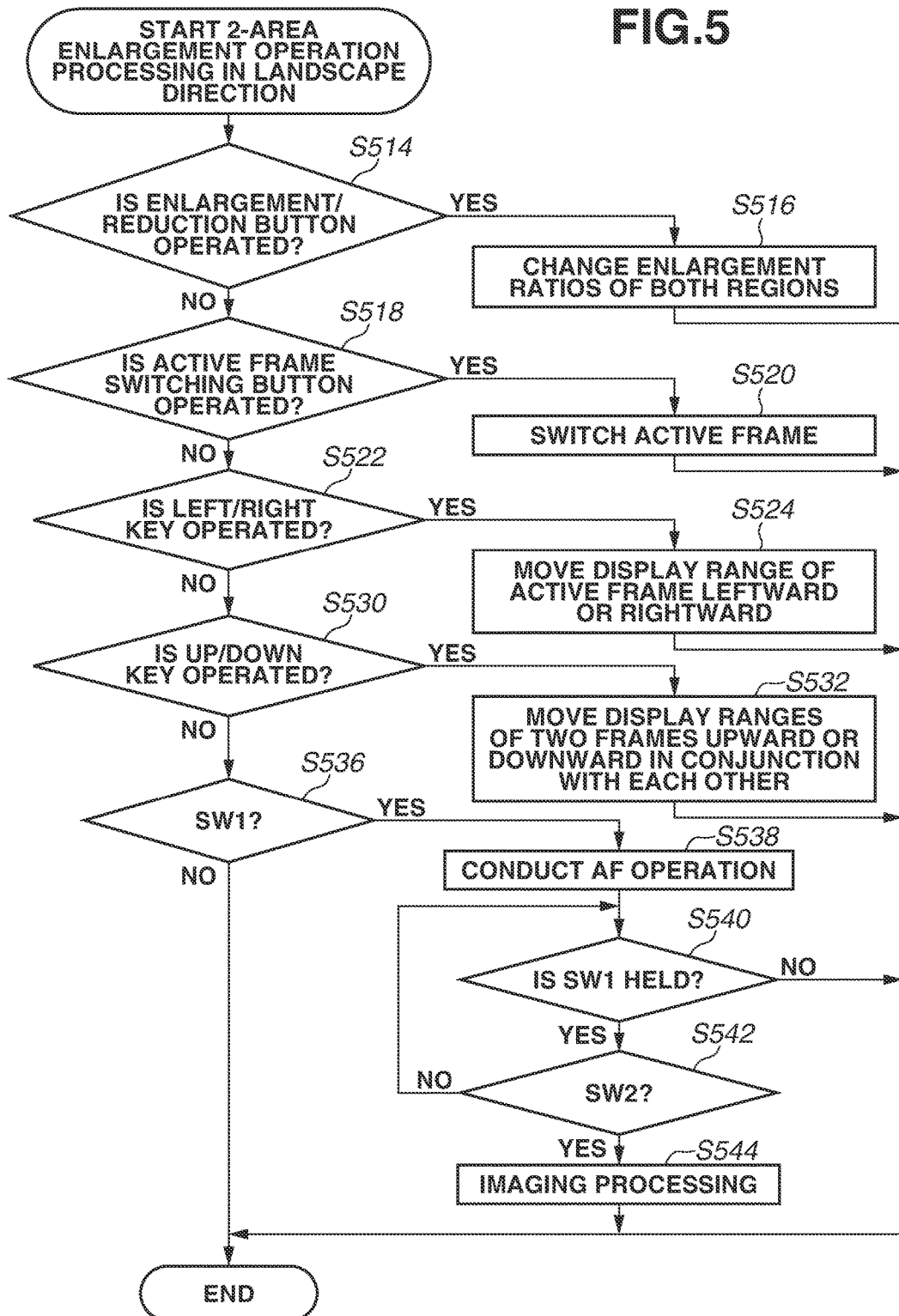
FIG. 5 is a flowchart illustrating operation processing for the 2-area enlargement in a landscape direction.

FIG. 5 is a flowchart illustrating details of the operation processing for the 2-area enlargement in the landscape direction in step S412 described above. The program recorded in the nonvolatile memory 56 is loaded into the system memory 52 and executed by the system control unit 50, by which this processing is realized.

In step S514, the system control unit 50 determines whether the enlargement button 77 is pressed or the reduction button 78 is pressed (enlargement/reduction instruction). If the enlargement button 77 is pressed or the reduction button 78 is pressed (YES in step S514), the processing proceeds to step S516. If not (NO in step S514), the processing proceeds to step S518.

Figure 7B:
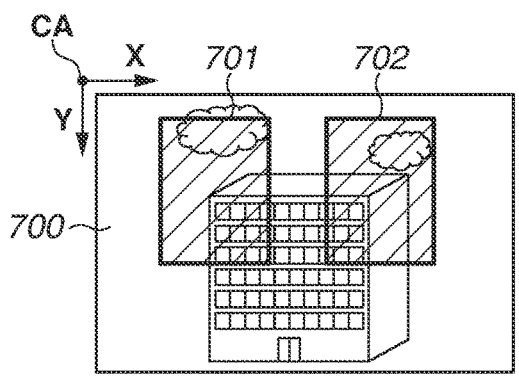
Figure 7B:
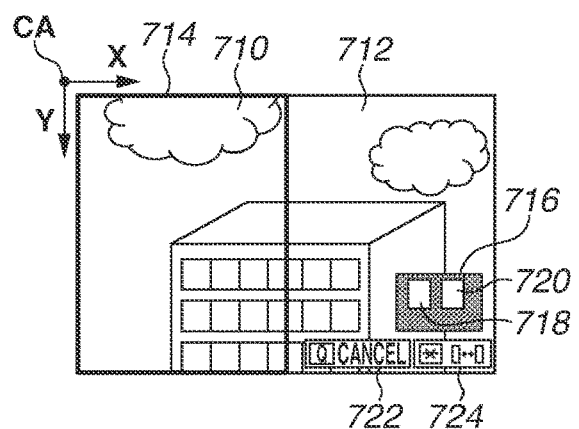
Figure 7B:
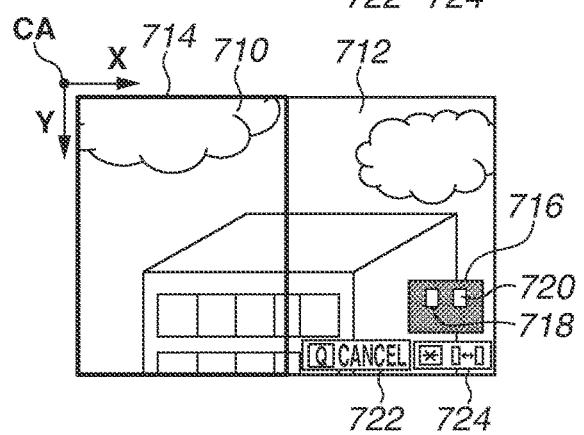

In step S516, the system control unit 50 changes magnification ratios of the LV images subjected to the 2-area enlargement according to the operation. If the enlargement button 77 is pressed, the system control unit 50 enlarges each of the LV images displayed in the left-side region 710 and the right-side region 712 so as to display it at a higher magnification ratio than a magnification ratio before the operation, and uses the same enlargement ratio for them, i.e., enlarges the LV images on the left side and the right side in conjunction with each other. If the reduction button 78 is pressed, the system control unit 50 reduces each of the LV images displayed in the left-side region 710 and the right-side region 712 so as to display it at a lower magnification ratio than the magnification ratio before the operation, and uses the same enlargement ratio for them. The changed enlargement ratios are recorded into the system memory 52, and, even when the 2-area enlargement is temporarily ended, the display is started from the same enlargement ratios if the 2-area enlargement display is presented again without the digital camera 100 powered off. FIG. 7B illustrates a display example when the enlargement button 77 is pressed and the live view images are enlarged from the state illustrated in FIG. 7A2. The live view images displayed in the left-side region 710 and the right-side region 712 are each enlarged in FIG. 7B more than in FIG. 7A2. Further, the enlargement leads to a display of a narrower range in the entire imaging range, thereby leading to a smaller size of each of the left-side indicator 718 and the right-side indicator 720 displayed in the enlarged position guide 716 in FIG. 7B than in FIG. 7A2.

In step S518, the system control unit 50 determines whether the active frame switching button 70d is pressed. If the active frame switching button 70d is pressed (YES in step S518), the processing proceeds to step S520. If not (NO in step S518), the processing proceeds to step S522.

Figure 7C:
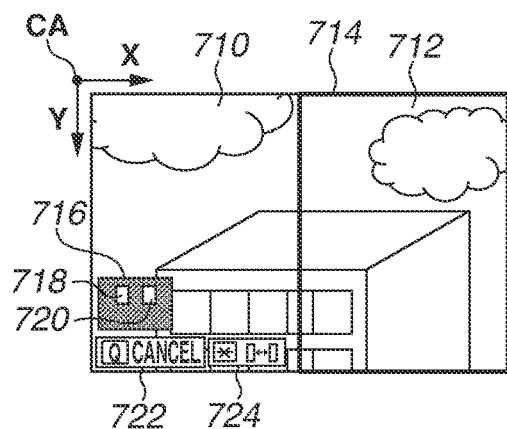

In step S520, the system control unit 50 moves the active frame 714 from the region with the active frame 714 placed thereon before the operation to the other region. FIG. 7C illustrates a display example when the active frame switching button 70d is pressed and the active frame 714 is moved from the state illustrated in FIG. 7B. The active frame 714 placed on the left-side region 710 in FIG. 7B is switched to the right-side region 712 in FIG. 7C. Further, the guide 722, the guide 724, and the enlarged position guide 716 are moved to positions superimposed on the left-side region 710 now set as the inactive frame.

In step S522, the system control unit 50 determines whether the left/right key in the cross key 74 is operated. If the left/right key is operated (YES in step S522), the processing proceeds to step S524. If not (NO in step S522), the processing proceeds to step S530.

Figure 7D:
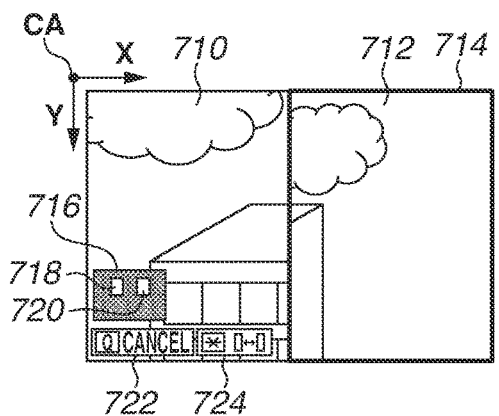

In step S524, the system control unit 50 moves the display range in the region with the active frame 714 placed thereon leftward or rightward according to the operation on the left/right key. More specifically, the system control unit 50 moves the display range in the region with the active frame 714 placed thereon leftward if the left button is pressed, and moves the display range in the region with the active frame 714 placed thereon rightward if the right button is pressed. FIG. 7D illustrates a display example when the right button is pressed several times from the state illustrated in FIG. 7C. The enlarged region displayed in the right-side region 712 with the active frame 714 placed thereon is moved more rightward in the imaging range in FIG. 7D than in FIG. 7C. As a result, the video image itself is scrolled from the right to the left. At that time, the display range in the left-side region 710 set as the inactive frame is not changed. As a result, the image is moved leftward or rightward in a disconnected manner when the left and right regions are out of contact with each other. In the enlarged position guide 716, the right-side indicator 720 is moved rightward in FIG. 7D more than in FIG. 7C so as to indicate that the display range in the right-side region 712 is moved further rightward. Position information indicating the changed display range (display position) is recorded into the system memory 52, and, even when the 2-area enlargement is temporarily ended, the same display range is displayed as the 2-area enlargement display if the 2-area enlargement display is presented again without the digital camera 100 powered off. Assume that, if a right edge of the display range in the left-side region 710 is in contact with a left edge of the display range in the right-side region 712, both the display ranges in the left-side region 710 and the right-side region 712 are moved rightward in conjunction with each other according to the instruction for the further rightward movement even when the active frame 714 is placed on the left-side region 710. However, when the right-side region 712 reaches a right edge of the entire imaging range, the display ranges cannot be moved further rightward and therefore are not moved even when the instruction for the further rightward movement is issued. On the other hand, assume that, if the left edge of the display range in the right-side region 712 is in contact with the right edge of the display range in the left-side region 710, both the display ranges in the left-side region 710 and the right-side region 712 are moved leftward in conjunction with each other according to an instruction for a further leftward movement even when the active frame 714 is placed on the right-side region 712. However, when the left-side region 710 reaches a left edge of the entire imaging range, the display ranges cannot be moved further leftward and therefore are not moved even when the instruction for the further leftward movement is issued.

In step S530, the system control unit 50 determines whether the up/down key in the cross key 74 is operated. If the up/down key is operated (YES in step S530), the processing proceeds to step S532. If not (NO in step S530), the processing proceeds to step S536.

Figure 7E:
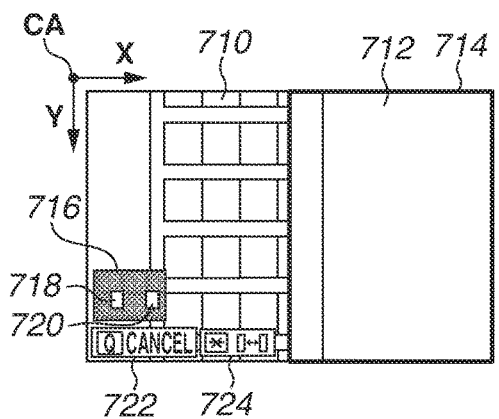

In step S532, the system control unit 50 moves the display ranges in the left-side region 710 and the right-side region 712 upward or downward in conjunction with each other according to the operation on the up/down key. More specifically, the system control unit 50 moves the display ranges in the left-side region 710 and the right-side region 712 upward in conjunction with each other if the up button is pressed, and moves the display ranges in the left-side region 710 and the right-side region 712 downward in conjunction with each other if the down button is pressed. FIG. 7E illustrates a display example when the down button is pressed several times from the state illustrated in FIG. 7D. The display range in each of the left-side region 710 and the right-side region 712 is moved downward in the imaging range in FIG. 7E more than in FIG. 7D. As a result, the video image itself is scrolled from the lower side to the upper side.

Figure 7F:
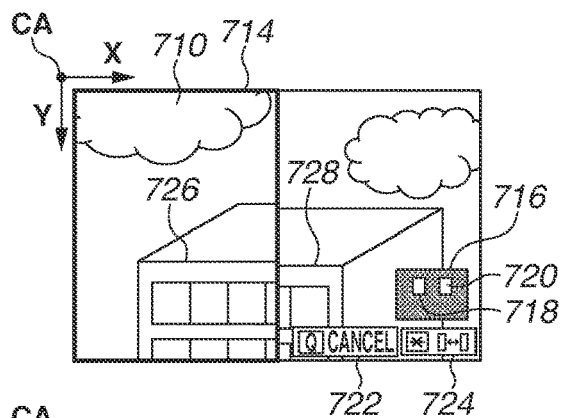

In the enlarged position guide 716, the left-side indicator 718 and the right-side indicator 720 are moved downward in FIG. 7E more than in FIG. 7D so as to indicate that the display ranges in the left-side region 710 and the right-side region 712 are moved further downward. The position information indicating the changed display ranges (display positions) is recorded into the system memory 52, and, even when the 2-area enlargement is temporarily ended, the same display ranges are displayed as the 2-area enlargement display if the 2-area enlargement display is presented again without the digital camera 100 powered off. The user sets the display ranges in the 2-area enlargement to separated two portions on a horizon, a horizontal line, a transverse outline of the building, or the like by repeating the operation like the above-described example. Then, the user can capture an image in which a line of the subject appears to extend horizontally by adjusting the orientation of the camera 100 in such a manner that lines of the subject in the left and right regions are in alignment with each other, and then capturing the image. FIG. 7F illustrates a display example when, in the 2-area enlargement display, the left-side region 710 is set to a subject portion including an edge 726 of the building, and the right-side region 712 is set to a subject portion including an edge 728 of the building at a position separated from the edge 726 of the building. The edge of the building normally appears to be a straight line, but, in the example illustrated in FIG. 7F, the edge 726 of the building displayed in the left-side region 710 and the edge 728 of the building displayed in the right-side region 712 do not appear to be a connected straight line and are slightly out of alignment with each other. The user can be aware that the digital camera 100 is not held horizontally with respect to the building by viewing such a display. The user can acquire the image in which the building appears to extend horizontally by capturing the image after adjusting the orientation of the digital camera 100 into such an orientation that the user can visually confirm the edge 726 of the building and the edge 728 of the building as one straight line.

In step S536, the system control unit 50 determines whether the shutter button 61 is half pressed and SW1 is turned on. If SW1 is turned on (YES in step S536), the processing proceeds to step S538. If not (NO in step S536), the system control unit 50 ends the operation processing when the orientation of the camera 100 is in the landscape direction and the processing proceeds to step S414 illustrated in FIG. 4.

In step S538, the system control unit 50 conducts the AF operation with respect to a central portion in the active frame 814 without ending the 2-area enlargement. After the digital camera 100 is focused as a result of the AF operation, the focus is fixed (AF lock) while SW1 is kept turned on.

In step S540, the system control unit 50 determines whether SW1 is kept turned on. If SW1 is kept turned on (YES in step S540), the processing proceeds to step S542. If not (NO in step S540), the system control unit 50 releases the AF lock state and ends the operation processing when the orientation of the camera 100 is in the landscape direction. Then, the processing proceeds to step S414 illustrated in FIG. 4.

In step S542, the system control unit 50 determines whether the shutter button 61 is fully pressed and SW2 is turned on. If SW2 is turned on (YES in step S542), the processing proceeds to step S544. If not (NO in step S542), the processing proceeds to step S540.

In step S544, the system control unit 50 performs the above-described imaging processing, i.e., the series of imaging processing operations from reading out the signal from the imaging unit 22 to writing the image file into the recording medium 200. The image captured by the imaging processing is not an image of the range subjected to the 2-area enlargement display but is an image of the entire imaging range. After the imaging processing is ended, the system control unit 50 ends the operation processing when the orientation of the camera 100 is in the landscape direction. After the imaging processing is ended, the system control unit 50 may end the 2-area enlargement and return to the live view display of the entire imaging range (same magnification ratio display, normal magnification ratio display). In other words, the processing may proceed to step S302 illustrated in FIG. 3.

Next, the operation processing for the 2-area enlargement at the time of the up/down arrangement in the 2-area enlargement processing will be described with reference to a flowchart illustrated in FIG. 6 and the screen display examples illustrated in FIGS. 8A1, 8A2, 8A3, and 8B to 8E.

Figure 6:
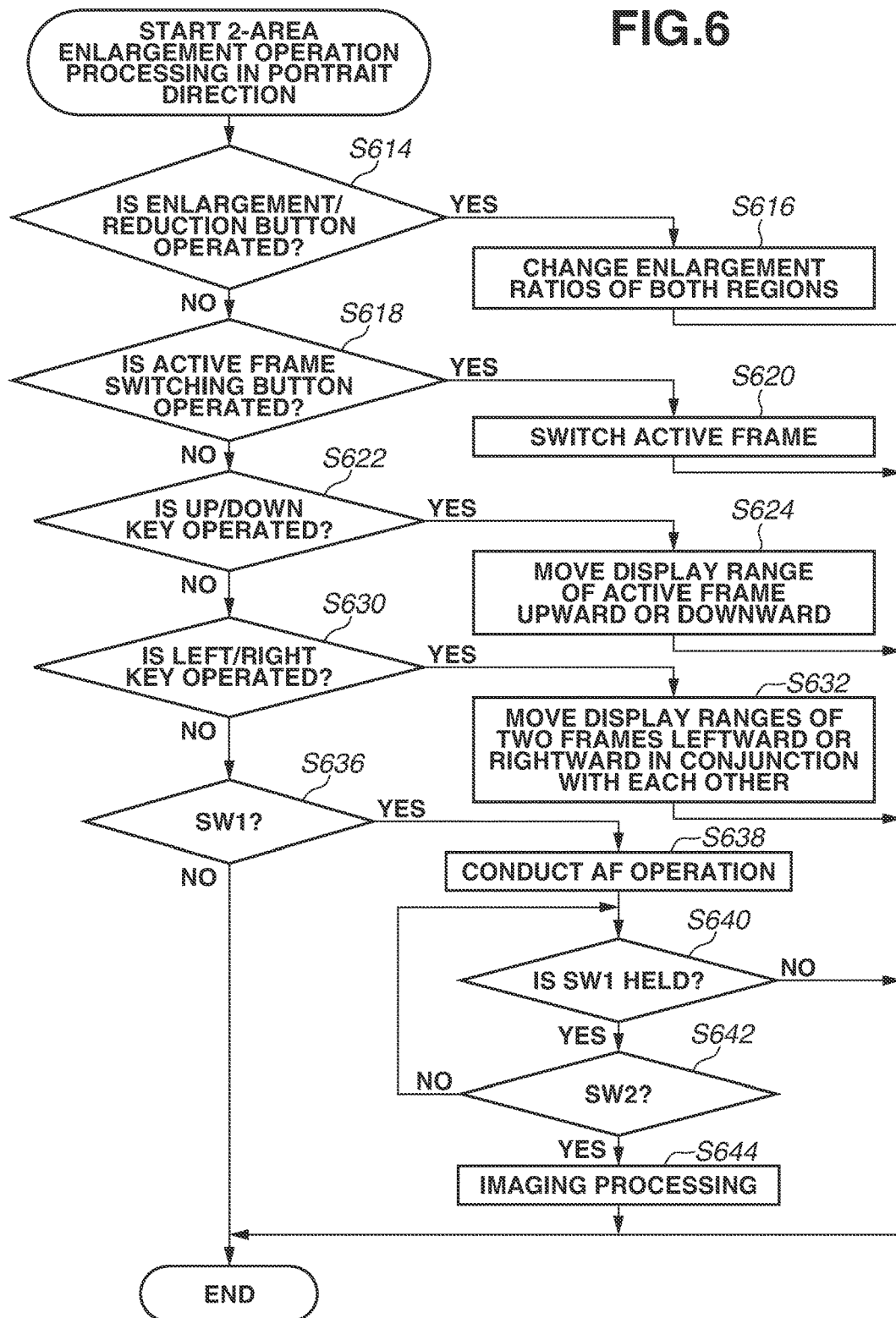
FIG. 6 is a flowchart illustrating operation processing for the 2-area enlargement in a portrait direction.

FIG. 6 is a flowchart illustrating details of the operation processing for the 2-area enlargement in the portrait direction in step S432 described above. The program recorded in the nonvolatile memory 56 is loaded into the system memory 52 and executed by the system control unit 50, by which this processing is realized.

In step S614, the system control unit 50 determines whether the enlargement button 77 is pressed or the reduction button 78 is pressed (enlargement/reduction instruction). If the enlargement button 77 is pressed or the reduction button 78 is pressed (YES in step S614), the processing proceeds to step S616. If not (NO in step S614), the processing proceeds to step S618.

In step S616, the system control unit 50 changes the magnification ratios of the LV images subjected to the 2-area enlargement according to the operation. If the enlargement button 77 is pressed, the system control unit 50 enlarges each of the LV images displayed in the upper-side region 810 and the lower-side region 812 so as to display it at a higher magnification ratio than a magnification ratio before the operation, and uses the same enlargement ratio for them (enlarges the LV images on the left side and the right side in conjunction with each other). If the reduction button 78 is pressed, the system control unit 50 reduces each of the LV images displayed in the upper-side region 810 and the lower-side region 812 so as to display it at a lower magnification ratio than the magnification ratio before the operation, and uses the same enlargement ratio for them. The changed enlargement ratios are recorded into the system memory 52, and, even when the 2-area enlargement is temporarily ended, the display is started from the same enlargement ratios if the 2-area enlargement display is presented again without the digital camera 100 powered off. FIG. 8B illustrates a display example when the reduction button 78 is pressed and the live view images are reduced from the state illustrated in FIG. 8A3. The live view images displayed in the upper-side region 810 and the lower-side region 812 are each reduced in FIG. 8B more than in FIG. 8A3. Further, the reduction leads to a display of a wider range in the entire imaging range, thereby leading to a larger size of each of the lower-side indicator 818 and the upper-side indicator 820 displayed in the enlarged position guide 816 in FIG. 8B than in FIG. 8A3.

In step S618, the system control unit 50 determines whether the active frame switching button 70d is pressed. If the active frame switching button 70d is pressed (YES in step S618), the processing proceeds to step S620. If not (NO in step S618), the processing proceeds to step S622.

Figure 8C:
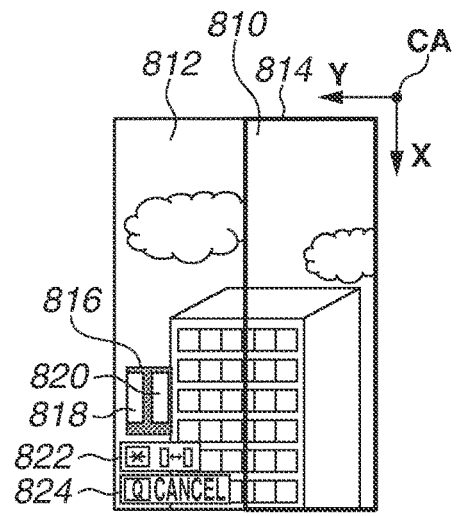

In step S620, the system control unit 50 moves the active frame 814 from the region with the active frame 814 placed thereon before the operation to the other region. FIG. 8C illustrates a display example when the active frame switching button 70d is pressed and the active frame 814 is moved from the state illustrated in FIG. 8B. The active frame 814 placed on the lower-side region 812 in FIG. 8B is switched to the upper-side region 810 in FIG. 8C. Further, the guide 822, the guide 824, and the enlarged position guide 816 are moved to positions superimposed on the lower-side region 812 now set as the inactive region.

In step S622, the system control unit 50 determines whether the up/down key in the cross key 74 is operated. If the up/down key is operated (YES in step S622), the processing proceeds to step S624. If not (NO in step S622), the processing proceeds to step S630.

Figure 8D:
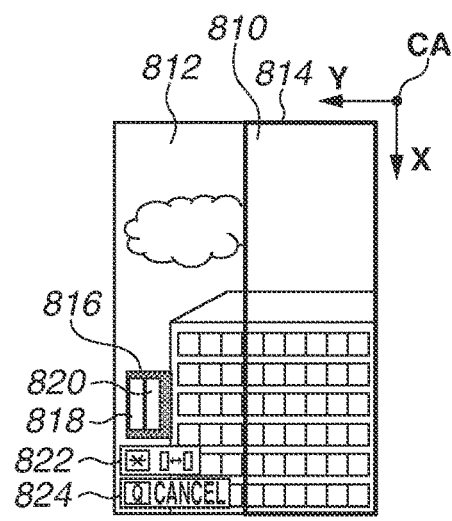

In step S624, the system control unit 50 moves the display range in the region with the active frame 814 placed thereon upward or downward according to the operation on the up/down key. More specifically, the system control unit 50 moves the display range in the region with the active frame 814 placed thereon upward if the up button is pressed, and moves the display range in the region with the active frame 814 placed thereon downward if the down button is pressed. FIG. 8D illustrates a display example when the down button is pressed several times from the state illustrated in FIG. 8C. The enlarged region displayed in the upper-side region 810 with the active frame 814 placed thereon is moved downward in the imaging range in FIG. 8D more than in FIG. 8C. As a result, the video image itself is scrolled from the lower side to the upper side. At this time, the display range in the lower-side region 812 set as the inactive frame is not changed, i.e., the image is moved upward or downward in a disconnected manner when the upper and lower regions are out of contact with each other. In the enlarged position guide 816, the upper-side indicator 820 is moved downward in FIG. 8D more than in FIG. 8C so as to indicate that the display range in the upper-side region 810 is moved further downward. Therefore, when the user views the display unit with the orientation of the camera 100 held in the portrait direction, the image appears as if being moving leftward. The position information indicating the changed display range (display position) is recorded into the system memory 52, and, even when the 2-area enlargement is temporarily ended, the same display range is displayed as the 2-area enlargement display if the 2-area enlargement display is presented again without the digital camera 100 powered off. Assume that, if a lower edge of the display range in the upper-side region 810 is in contact with an upper edge of the display range in the lower-side region 812, both the display ranges in the upper-side region 810 and the lower-side region 812 are moved downward in conjunction with each other according to the instruction for the further downward movement. However, when the lower-side region 812 reaches a lower edge of the entire imaging range, the display ranges cannot be moved further downward and therefore are not moved even when the instruction for the further downward movement is issued. On the other hand, assume that, if the upper edge of the display range in the lower-side region 812 is in contact with the lower edge of the display range in the upper-side region 810, both the display ranges in the upper-side region 810 and the lower-side region 812 are moved upward in conjunction with each other according to an instruction for a further upward movement even when the active frame 814 is placed on the lower-side region 812. However, when the upper-side region 810 reaches an upper edge of the entire imaging range, the display ranges cannot be moved further upward and therefore are not moved even when the instruction for the further upward movement is issued.

In step S630, the system control unit 50 determines whether the left/right key in the cross key 74 is operated. If the left/right key is operated (YES in step S630), the processing proceeds to step S632. If not (NO in step S630), the processing proceeds to step S636.

Figure 8E:
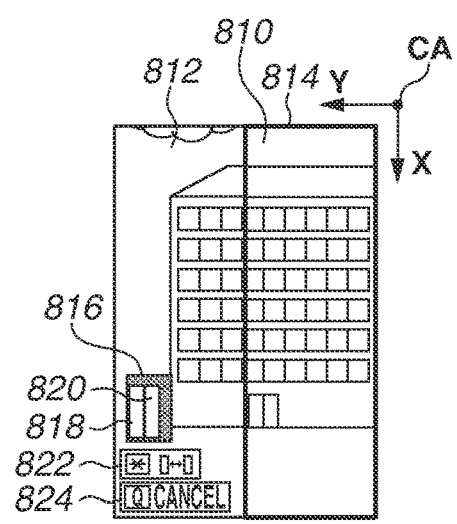

In step S632, the system control unit 50 moves the display ranges in the upper-side region 810 and the lower-side region 812 leftward or rightward in conjunction with each other according to the operation on the left/right key. More specifically, the system control unit 50 moves the display ranges in the upper-side region 810 and the lower-side region 812 leftward in conjunction with each other if the left button is pressed, and moves the display ranges in the upper-side region 810 and the lower-side region 812 rightward in conjunction with each other if the right button is pressed. FIG. 8E illustrates a display example when the right button is pressed several times from the state illustrated in FIG. 8D. The display range in each of the upper-side region 810 and the lower-side region 812 is moved rightward in the imaging range in FIG. 8E more than in FIG. 8D. As a result, the video image itself is scrolled from the right to the left. In the enlarged position guide 816, the lower-side indicator 818 and the upper-side indicator 820 are moved rightward in FIG. 8E more than in FIG. 8D so as to indicate that the display ranges in the upper-side region 810 and the lower-side region 812 are moved further rightward. Therefore, when the user views the display unit 28 with the orientation of the camera 100 held in the portrait direction, the image appears as if being moved downward. The position information indicating the changed display ranges (display positions) is recorded into the system memory 52, and, even when the 2-area enlargement is temporarily ended, the same display ranges are displayed as the 2-area enlargement display if the 2-area enlargement display is presented again without the digital camera 100 powered off. The user sets the display ranges in the 2-area enlargement to separated two portions on the horizon, the horizontal line, the transverse outline of the building, or the like by repeating the operation like the above-described example. Then, the user can capture the image in which the line of the subject appears to extend horizontally even when the orientation of the camera 100 is in the portrait direction, by adjusting the orientation of the camera 100 in such a manner that lines of the subject in the upper and lower regions are in alignment with each other, and then capturing the image.

Processing in steps S636 to S644 is processing similar to that performed in steps S536 to S544 described above, and therefore a description thereof will be omitted below.

In the above-described manner, according to the present exemplary embodiment, the 2-area enlargement display in the left/right arrangement and the 2-area enlargement display in the up/down arrangement are automatically selectively used according to the orientation of the camera 100 when the 2-area enlargement display is started. More specifically, the 2-area enlargement display is presented in the left/right arrangement if the orientation of the camera 100 is the landscape orientation, and is presented in the up/down arrangement if the orientation of the camera 100 is the portrait orientation. As a result, the user does not have to perform the operation for changing the arrangement of the 2-area enlargement display in consideration of the orientation of the camera 100, and therefore can easily adjust a tilt angle of the camera 100 in each of the cases where the orientation of the camera 100 is the landscape orientation and where the orientation of the camera 100 is the portrait orientation.

Figure 7G:
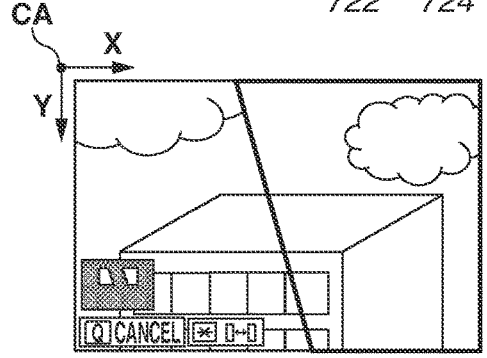

In the present exemplary embodiment, the 2-area enlargement in the left/right arrangement and the 2-area enlargement in the up/down arrangement have been described referring to the example in which, in both of them, the screen is divided into each of rectangles having the same size and the live view image of each of the regions is displayed in this divided display range. However, how the screen is divided is not limited to this example, and the digital camera 100 is configured to be able to divide the screen into a trapezoidal shape as illustrated in FIG. 7G or a right triangular shape and display the live view image of each of the regions in this divided display range. Further, the digital camera 100 is configured to be able to use different sizes as sizes of the rectangles of the respective display ranges in the active frame and the inactive frame within a range that allows the rectangles to be contained in the screen. With this configuration, the digital camera 100 can flexibly deal with even an environment or a subject difficult to be confirmed in the rectangles having the same size.

The digital camera 100 may be configured to record arrangement information indicating whether the 2-area enlargement display before the end of the 2-area enlargement has been the left/right arrangement or the up/down arrangement (type information of the 2-area enlargement display) into the nonvolatile memory 56 or the system memory 52, when ending the 2-area enlargement in step S450 illustrated in FIG. 4. Then, the digital camera 100 may refer to the stored previous arrangement information in step S410 or S430 and perform control in the following manner when starting the 2-area enlargement display again next. If the 2-area enlargement display has also been presented in the same arrangement (type) last time, the digital camera 100 presents the 2-area enlargement display with use of information indicating the enlargement ratio and the enlarged position (position of the display range) used last time, which has been stored at the time of the 2-area enlargement display presented last time (at the time of the display presented last time). If the 2-area enlargement display has been presented in the different arrangement last time, the digital camera 100 presents the 2-area enlargement display with use of the enlargement ratio and the enlarged position according to initial settings (defaults) without use of the information indicating the enlargement ratio and the enlarged position (position of the display range) used last time, which has been stored at the time of the 2-area enlargement display presented last time.

Further, the digital camera 100 may be configured to store the record of the enlargement ratio or the display range in step S516, S524, or S532 in the 2-area enlargement in the left/right arrangement and store the record of the enlargement ratio or the display range in step S616, S624, or S632 in the 2-area enlargement in the up/down arrangement separately from each other. The digital camera 100 stores each of them separately as the enlargement ratio and the display range for the left/right arrangement or the enlargement ratio and the display range for the up/down arrangement. Then, the digital camera 100 may be configured to refer to the stored enlargement ratio and display range for the left/right arrangement and present the 2-area enlargement display in step S410, and refer to the enlargement ratio and the display range for the up/down arrangement and present the 2-area enlargement display in step S430, when starting the 2-area enlargement display. By operating in this manner, the digital camera 100 can restart the 2-area enlargement display according to the enlargement ratio and the display range employed when the 2-area enlargement display has been presented in the same arrangement previously, i.e., when the 2-area enlargement has been carried out in the same arrangement last time, when starting the 2-area enlargement display.

Regarding the above-described various kinds of control that have been described assuming that the system control unit 50 performs them, a single hardware device may perform them, or a plurality of hardware devices may control the entire apparatus by dividing the processing among them.

Further, although the present disclosure has been described in detail based on the representative exemplary embodiments thereof, the present disclosure is not limited thereto, and includes various embodiments within a range that does not depart from the spirit of the present disclosure. Further, each of the above-described exemplary embodiments merely indicates one exemplary embodiment of the present disclosure, and the individual exemplary embodiments can also be combined arbitrarily.

Further, the above-described exemplary embodiments have been described referring to the example in which the present disclosure is applied to the digital camera 100, but the present disclosure is not limited to this example and can be applied to any imaging control apparatus capable of presenting the 2-area enlargement display. More specifically, the present disclosure can be applied to a personal computer and a personal digital assistant (PDA) having a camera function, a mobile phone terminal equipped with a camera and a mobile image viewer equipped with a camera, a music player equipped with a camera, a game machine equipped with a camera, and an electronic book reader equipped with a camera. Further, the present disclosure can be applied to a tablet terminal equipped with a camera, a smart-phone equipped with a camera, home electronics and an in-vehicle apparatus including a camera function and a display, and the like. Further, the present disclosure can also be applied to apparatuses such as a smart-phone, a tablet personal computer (PC), and a desktop PC that receive a live view image captured by a digital camera or the like via wired or wireless communication to display the received live view image, and remotely control the digital camera (including a network camera).

According to the above-described exemplary embodiments, the user can easily adjust the tilt angle of the imaging apparatus both when the orientation of the imaging apparatus is the landscape orientation and when the orientation of the imaging apparatus is the portrait orientation.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-254226, filed Dec. 27, 2016, which is hereby incorporated by reference herein in its entirety.

What is claimed is:

1. An imaging apparatus comprising:
an orientation detector configured to detect an orientation of the imaging apparatus; and
a memory and at least one processor to perform operations of the following units:
a control unit configured to perform control so as to present a first 2-area enlargement display of displaying live view images captured at two imaging regions in an imaging unit that are separated in a width direction while arranging them on a display unit if the orientation detection unit detects that the orientation of the imaging apparatus is a first orientation, and present a second 2-area enlargement display of displaying live view images captured at two imaging regions in the imaging unit that are separated in a height direction while arranging them on the display unit if the orientation detection unit detects that the orientation of the imaging apparatus is a second orientation, the control unit being configured to perform control to end the first 2-area enlargement display based on the orientation of the imaging apparatus changed from the first orientation in a manner satisfying a predetermined condition when the first 2-area enlargement display is presented.

2. The imaging apparatus according to claim 1, wherein the control unit performs control to end the second 2-area enlargement display based on the orientation of the imaging apparatus changed from the second orientation in a manner satisfying a predetermined condition while the second 2-area enlargement display is presented.

3. The imaging apparatus according to claim 1, wherein the second orientation is an orientation different from the first orientation by 90 degrees.

4. The imaging apparatus according to claim 1, wherein the first orientation is such an orientation that a left/right direction of the imaging unit extends at a predetermined angle or smaller from a direction perpendicular to a direction of gravitational force, and the second orientation is such an orientation that an up/down direction of the imaging unit extends at a predetermined angle or smaller from the direction perpendicular to the direction of gravitational force.

5. The imaging apparatus according to claim 1, wherein the first orientation is a regular orientation and the second orientation is a vertical orientation.

6. The imaging apparatus according to claim 1, further comprising:
a first operation member configured to issue an instruction for a first direction; and
a second operation member configured to issue an instruction for a second direction different from the first direction by 90 degrees,
wherein the control unit performs control to move one of two imaging regions corresponding to display ranges displayed on the display unit in a left/right direction of the imaging unit if the first operation member is operated, and move both of the two imaging regions in an up/down direction of the imaging unit in conjunction with each other if the second operation member is operated, while the first 2-area enlargement display is presented, and
wherein the control unit performs control to move both of two imaging regions corresponding to display ranges displayed on the display unit in the left/right direction of the imaging unit in conjunction with each other if the first operation member is operated, and move one of the two imaging regions in the up/down direction of the imaging unit if the second operation member is operated, while the second 2-area enlargement display is presented.

7. The imaging apparatus according to claim 1, wherein the control unit performs control to switch a display from the first 2-area enlargement display to the second 2-area enlargement display according to an operation from a user onto a specific operation member.

8. The imaging apparatus according to claim 1, further comprising recorder unit configured to record position information indicating display ranges displayed in the first 2-area enlargement display or the second 2-area enlargement display, and type information indicating whether the 2-area enlargement display presented last time has been the first 2-area enlargement display or the second 2-area enlargement display, wherein the control unit performs control to refer to the type information when the first 2-area enlargement display or the second 2-area enlargement display is started, and present the 2-area enlargement display according to the display ranges based on the position information if presenting the same type of 2-area enlargement display as the last time, and present the 2-area enlargement display according to display ranges not based on the position information if presenting the 2-area enlargement display different from the last time.

9. The imaging apparatus according to claim 1, further comprising a recorder configured to record first position information indicating display ranges displayed in the first 2-area enlargement display, and second position information indicating display ranges displayed in the second 2-area enlargement display, wherein the control unit performs control to present the 2-area enlargement display according to the display ranges based on the first position information when the first 2-area enlargement display is started, and present the 2-area enlargement display according to the display ranges based on the second position information when the second 2-area enlargement display is started.

10. The imaging apparatus according to claim 1, wherein, in the first 2-area enlargement display, the live view images captured at the two imaging regions in the imaging unit that are separated in the width direction are displayed in obliquely divided two display regions on the display unit, respectively.

11. A method for controlling an imaging apparatus, comprising:
detecting an orientation of the imaging apparatus; and
performing control to present a first 2-area enlargement display of displaying live view images captured at two imaging regions in an imaging unit that are separated in a width direction while arranging them on a display unit if the orientation of the imaging apparatus is detected to be a first orientation, and present a second 2-area enlargement display of displaying live view images captured by two imaging regions in the imaging unit that are separated in a height direction while arranging them on the display unit if the orientation of the imaging apparatus is detected to be a second orientation, and end the first 2-area enlargement display based on the orientation of the imaging apparatus changed from the first orientation in a manner satisfying a predetermined condition when the first 2-area enlargement display is being presented.

12. A non-transitory computer-readable storage medium storing a program for causing a computer to execute a method for controlling an imaging apparatus, the method comprising: detecting an orientation of the imaging apparatus; and performing control to present a first 2-area enlargement display of displaying live view images captured at two imaging regions in an imaging unit that are separated in a width direction while arranging them on a display unit if the orientation of the imaging apparatus is detected to be a first orientation, and present a second 2-area enlargement display of displaying live view images captured by two imaging regions in the imaging unit that are separated in a height direction while arranging them on the display unit if the orientation of the imaging apparatus is detected to be a second orientation, and end the first 2-area enlargement display based on the orientation of the imaging apparatus changed from the first orientation in a manner satisfying a predetermined condition when the first 2-area enlargement display is being presented.

13. An imaging apparatus comprising:
an orientation detector configured to detect an orientation of the imaging apparatus; and
a memory and at least one processor to perform operations of the following units:
a control unit configured to perform control so as to present a 2-area enlargement display of displaying live view images captured at two imaging regions in an imaging unit that are separated in a width direction while arranging them on a display unit in the case that the orientation detection unit detects that the orientation of the imaging apparatus is a first orientation, the control unit being configured to perform control to end the 2-area enlargement display based on the orientation of the imaging apparatus changed from the first orientation in a manner satisfying a predetermined condition when the 2-area enlargement display is presented.

14. A method for controlling an imaging apparatus, comprising:
detecting an orientation of the imaging apparatus; and
performing control to present a 2-area enlargement display of displaying live view images captured at two imaging regions in an imaging unit that are separated in a width direction while arranging them on a display unit in the case that the orientation of the imaging apparatus is a first orientation, and end the 2-area enlargement display based on the orientation of the imaging apparatus changed from the first orientation in a manner satisfying a predetermined condition when the 2-area enlargement display is being presented.

15. A non-transitory computer-readable storage medium storing a program for causing a computer to execute a method for controlling an imaging apparatus, the method comprising:
detecting an orientation of the imaging apparatus; and
performing control to present a 2-area enlargement display of displaying live view images captured at two imaging regions in an imaging unit that are separated in a width direction while arranging them on a display unit in the case that the orientation of the imaging apparatus is a first orientation, and end the 2-area enlargement display based on the orientation of the imaging apparatus changed from the first orientation in a manner satisfying a predetermined condition when the first 2-area enlargement display is being presented.

* * * * *